(12) United States Patent
Holtzman et al.

(10) Patent No.: US 7,600,017 B2
(45) Date of Patent: *Oct. 6, 2009

(54) SYSTEM AND METHOD FOR SCORING ELECTRONIC MESSAGES

(75) Inventors: David Holtzman, Herndon, VA (US); Robert Kodey, Reston, VA (US); David Pool, Winchester, VA (US)

(73) Assignee: BuzzMetrics, Ltd., Herzlia Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/651,661

(22) Filed: Jan. 10, 2007

(65) Prior Publication Data

US 2007/0124432 A1 May 31, 2007

Related U.S. Application Data

(63) Continuation of application No. 09/879,220, filed on Jun. 13, 2001, now Pat. No. 7,185,065, which is a continuation-in-part of application No. 09/795,968, filed on Mar. 1, 2001, now abandoned, which is a continuation-in-part of application No. 09/686,516, filed on Oct. 11, 2000, now Pat. No. 7,197,470.

(51) Int. Cl.
  *G06F 15/173* (2006.01)
(52) U.S. Cl. .................................... 709/224
(58) Field of Classification Search ......... 709/217–219, 709/224; 704/9
  See application file for complete search history.

(56) References Cited

U.S. PATENT DOCUMENTS 3,950,618 A   4/1976   Bloisi
5,041,972 A   8/1991   Frost
5,077,785 A   12/1991  Monson
5,124,911 A   6/1992   Sack
5,301,109 A   4/1994   Landauer et al.
5,317,507 A   5/1994   Gallant
5,321,833 A   6/1994   Chang et al.
5,371,673 A   12/1994  Fan (Continued)

FOREIGN PATENT DOCUMENTS

EP           1052582        11/2000
WO       WO 00/17824        3/2000

OTHER PUBLICATIONS eWatch's archived web site retrieved from [URL: http://web.archive.org/web/19980522190526/www.ewatch.com] on Sep. 8, 2004, archived May 22, 1998.

(Continued)

*Primary Examiner*—Benjamin R Bruckart
(74) *Attorney, Agent, or Firm*—Hanley, Flight & Zimmerman, LLC

(57) ABSTRACT

A system and method for collecting and analyzing electronic discussion messages to categorize the message communications and the identify trends and patterns in pre-determined markets. The system comprises an electronic data discussion system wherein electronic messages are collected and analyzed according to characteristics and data inherent in the messages. The system further comprises a data store for storing the message information and results of any analyses performed. Objective data is collected by the system for use in analyzing the electronic discussion data against real-world events to facilitate trend analysis and event forecasting based on the volume, nature and content of messages posted to electronic discussion forums.

76 Claims, 14 Drawing Sheets

U.S. PATENT DOCUMENTS

| | | | |
|---|---|---|---|
| 5,495,412 A | 2/1996 | Thiessen | |
| 5,519,608 A | 5/1996 | Kupiec | |
| 5,537,618 A | 7/1996 | Boulton et al. | |
| 5,659,732 A * | 8/1997 | Kirsch | 707/5 |
| 5,659,742 A | 8/1997 | Beattie et al. | |
| 5,668,953 A | 9/1997 | Sloo | |
| 5,671,333 A | 9/1997 | Catlett et al. | |
| 5,675,710 A | 10/1997 | Lewis | |
| 5,696,962 A | 12/1997 | Kupiec | |
| 5,754,939 A | 5/1998 | Herz et al. | |
| 5,761,383 A | 6/1998 | Engel | |
| 5,794,412 A | 8/1998 | Ronconi | |
| 5,819,285 A | 10/1998 | Damico et al. | |
| 5,822,744 A | 10/1998 | Kessel | |
| 5,836,771 A | 11/1998 | Ho et al. | |
| 5,845,278 A | 12/1998 | Kirsch et al. | |
| 5,857,179 A | 1/1999 | Vaithyanathan et al. | |
| 5,884,302 A | 3/1999 | Ho | |
| 5,895,450 A | 4/1999 | Sloo | |
| 5,911,043 A | 6/1999 | Duffy et al. | |
| 5,920,854 A | 7/1999 | Kirsch et al. | |
| 5,924,094 A | 7/1999 | Sutter | |
| 5,950,172 A | 9/1999 | Klingman | |
| 5,950,189 A | 9/1999 | Cohen et al. | |
| 5,953,718 A | 9/1999 | Wical | |
| 5,974,412 A * | 10/1999 | Hazlehurst et al. | 707/3 |
| 5,983,214 A | 11/1999 | Lang et al. | |
| 5,983,216 A | 11/1999 | Kirsch et al. | |
| 6,006,221 A | 12/1999 | Liddy et al. | |
| 6,012,053 A | 1/2000 | Pant et al. | |
| 6,021,409 A | 2/2000 | Burrows | |
| 6,026,387 A | 2/2000 | Kesel | |
| 6,026,388 A | 2/2000 | Liddy et al. | |
| 6,029,161 A | 2/2000 | Lang et al. | |
| 6,029,195 A | 2/2000 | Herz | |
| 6,032,145 A | 2/2000 | Beall et al. | |
| 6,035,294 A | 3/2000 | Fish | |
| 6,038,610 A | 3/2000 | Belfiore et al. | |
| 6,061,789 A | 5/2000 | Hauser et al. | |
| 6,064,980 A | 5/2000 | Jacobi et al. | |
| 6,067,539 A | 5/2000 | Cohen | |
| 6,078,892 A | 6/2000 | Anderson et al. | |
| 6,081,793 A | 6/2000 | Challener et al. | |
| 6,094,657 A | 7/2000 | Hailpern et al. | |
| 6,098,066 A | 8/2000 | Snow et al. | |
| 6,112,203 A | 8/2000 | Bharat et al. | |
| 6,119,933 A | 9/2000 | Wong | |
| 6,138,113 A | 10/2000 | Dean et al. | |
| 6,138,128 A | 10/2000 | Perkowitz et al. | |
| 6,169,986 B1 | 1/2001 | Bowman et al. | |
| 6,185,558 B1 | 2/2001 | Bowman et al. | |
| 6,192,360 B1 | 2/2001 | Dumais et al. | |
| 6,202,068 B1 | 3/2001 | Kraay et al. | |
| 6,233,575 B1 | 5/2001 | Agrawal et al. | |
| 6,236,977 B1 | 5/2001 | Verba et al. | |
| 6,236,987 B1 | 5/2001 | Horowitz et al. | |
| 6,236,991 B1 | 5/2001 | Frauenhofer et al. | |
| 6,260,041 B1 | 7/2001 | Gonzalez et al. | |
| 6,266,664 B1 * | 7/2001 | Russell-Falla et al. | 707/5 |
| 6,269,362 B1 | 7/2001 | Broder et al. | |
| 6,278,990 B1 | 8/2001 | Horowitz | |
| 6,289,342 B1 | 9/2001 | Lawrence et al. | |
| 6,304,864 B1 | 10/2001 | Liddy et al. | |
| 6,308,176 B1 | 10/2001 | Bagshaw | |
| 6,314,420 B1 * | 11/2001 | Lang et al. | 707/3 |
| 6,324,648 B1 | 11/2001 | Grantges, Jr. | |
| 6,334,131 B2 | 12/2001 | Chakrabarti et al. | |
| 6,360,215 B1 | 3/2002 | Judd et al. | |
| 6,362,837 B1 | 3/2002 | Ginn | |
| 6,366,908 B1 | 4/2002 | Chong et al. | |
| 6,377,946 B1 | 4/2002 | Okamoto et al. | |
| 6,385,586 B1 | 5/2002 | Dietz | |
| 6,393,460 B1 * | 5/2002 | Gruen et al. | 709/204 |
| 6,401,118 B1 | 6/2002 | Thomas | |
| 6,411,936 B1 | 6/2002 | Sanders | |
| 6,418,433 B1 | 7/2002 | Chakrabarti et al. | |
| 6,421,675 B1 | 7/2002 | Ryan et al. | |
| 6,434,549 B1 | 8/2002 | Linetsky et al. | |
| 6,493,703 B1 * | 12/2002 | Knight et al. | 707/3 |
| 6,507,866 B1 * | 1/2003 | Barchi | 709/207 |
| 6,510,513 B1 | 1/2003 | Danieli | |
| 6,513,032 B1 | 1/2003 | Sutter | |
| 6,519,631 B1 | 2/2003 | Rosenschein et al. | |
| 6,526,440 B1 | 2/2003 | Bharat | |
| 6,539,375 B2 * | 3/2003 | Kawasaki | 707/5 |
| 6,546,390 B1 | 4/2003 | Pollack et al. | |
| 6,553,358 B1 | 4/2003 | Horvitz | |
| 6,571,234 B1 * | 5/2003 | Knight et al. | 707/3 |
| 6,571,238 B1 | 5/2003 | Pollack et al. | |
| 6,574,614 B1 | 6/2003 | Kesel | |
| 6,584,470 B2 | 6/2003 | Veale | |
| 6,606,644 B1 | 8/2003 | Ford et al. | |
| 6,622,140 B1 | 9/2003 | Kantrowitz | |
| 6,640,218 B1 | 10/2003 | Golding et al. | |
| 6,651,086 B1 | 11/2003 | Manber et al. | |
| 6,654,813 B1 | 11/2003 | Black et al. | |
| 6,658,389 B1 | 12/2003 | Alpdemir | |
| 6,662,170 B1 | 12/2003 | Dom | |
| 6,678,516 B2 | 1/2004 | Nordman et al. | |
| 6,708,215 B1 | 3/2004 | Hingorani et al. | |
| 6,721,734 B1 * | 4/2004 | Subasic et al. | 707/5 |
| 6,751,606 B1 | 6/2004 | Fries et al. | |
| 6,751,683 B1 * | 6/2004 | Johnson et al. | 710/16 |
| 6,757,646 B2 | 6/2004 | Marchisio | |
| 6,772,141 B1 | 8/2004 | Pratt et al. | |
| 6,775,664 B2 | 8/2004 | Lang et al. | |
| 6,778,975 B1 | 8/2004 | Anick et al. | |
| 6,782,393 B1 | 8/2004 | Balabanovic et al. | |
| 6,795,826 B2 | 9/2004 | Flinn et al. | |
| 6,807,566 B1 * | 10/2004 | Bates et al. | 709/206 |
| 6,889,325 B1 | 5/2005 | Sipman et al. | |
| 6,892,944 B2 | 5/2005 | Chung et al. | |
| 6,928,526 B1 | 8/2005 | Zhu et al. | |
| 6,978,292 B1 * | 12/2005 | Murakami et al. | 709/204 |
| 6,983,320 B1 | 1/2006 | Thomas | |
| 6,999,914 B1 * | 2/2006 | Boerner et al. | 704/1 |
| 7,043,760 B2 | 5/2006 | Holtzman et al. | |
| 7,117,368 B2 | 10/2006 | Sako | |
| 7,146,416 B1 * | 12/2006 | Yoo et al. | 709/224 |
| 7,188,078 B2 | 3/2007 | Arnett et al. | |
| 7,188,079 B2 | 3/2007 | Arnett et al. | |
| 7,197,470 B1 | 3/2007 | Arnett et al. | |
| 7,277,919 B1 * | 10/2007 | Donoho et al. | 709/206 |
| 7,422,150 B2 | 9/2008 | Chung | |
| 7,431,209 B2 | 10/2008 | Chung | |
| 2001/0011351 A1 | 8/2001 | Sako | |
| 2001/0018858 A1 | 9/2001 | Dwek | |
| 2001/0020228 A1 | 9/2001 | Cantu et al. | |
| 2001/0034708 A1 | 10/2001 | Walker et al. | |
| 2001/0042087 A1 | 11/2001 | Kephart et al. | |
| 2002/0010691 A1 | 1/2002 | Chen | |
| 2002/0019764 A1 | 2/2002 | Mascarenhas | |
| 2002/0032772 A1 | 3/2002 | Olstad et al. | |
| 2002/0059258 A1 | 5/2002 | Kirkpatrick | |
| 2002/0087515 A1 | 7/2002 | Swannack | |
| 2002/0103801 A1 | 8/2002 | Lyons | |
| 2002/0123988 A1 | 9/2002 | Dean et al. | |
| 2002/0133481 A1 | 9/2002 | Smith et al. | |
| 2002/0159642 A1 | 10/2002 | Whitney | |
| 2003/0034393 A1 | 2/2003 | Chung | |
| 2003/0046144 A1 | 3/2003 | Clark et al. | |
| 2003/0062411 A1 | 4/2003 | Chung et al. | |
| 2003/0070338 A1 | 4/2003 | Roshkoff | |
| 2003/0088532 A1 | 5/2003 | Hampshire | |

| | | | |
|---|---|---|---|
| 2003/0094489 | A1 | 5/2003 | Wald |
| 2003/0173404 | A1 | 9/2003 | Chung et al. |
| 2004/0024752 | A1 | 2/2004 | Manber et al. |
| 2004/0059708 | A1 | 3/2004 | Dean et al. |
| 2004/0059729 | A1 | 3/2004 | Krupin et al. |
| 2004/0078432 | A1 | 4/2004 | Manber et al. |
| 2004/0111412 | A1 | 6/2004 | Broder |
| 2004/0122811 | A1 | 6/2004 | Page |
| 2004/0181675 | A1 | 9/2004 | Hansen |
| 2004/0199498 | A1 | 10/2004 | Kapur et al. |
| 2004/0205482 | A1 | 10/2004 | Basu et al. |
| 2004/0210561 | A1 | 10/2004 | Shen |
| 2005/0049908 | A2 | 3/2005 | Hawks |
| 2005/0114161 | A1 | 5/2005 | Garg et al. |
| 2005/0125216 | A1* | 6/2005 | Chitrapura et al. ............. 704/1 |
| 2006/0004691 | A1 | 1/2006 | Sifry |
| 2006/0015737 | A1 | 1/2006 | Canard et al. |
| 2006/0069589 | A1 | 3/2006 | Nigam et al. |
| 2006/0173819 | A1 | 8/2006 | Watson |
| 2006/0173837 | A1 | 8/2006 | Berstis et al. |
| 2006/0206505 | A1 | 9/2006 | Hyder et al. |
| 2007/0027840 | A1 | 2/2007 | Cowling et al. |
| 2007/0143853 | A1 | 6/2007 | Tsukamoto |
| 2007/0282621 | A1 | 12/2007 | Altman et al. |
| 2008/0059791 | A1 | 3/2008 | Lee et al. |
| 2008/0262920 | A1 | 10/2008 | O'Neill et al. |

OTHER PUBLICATIONS

Web site describing CyberSleuth retrieved from [URL: http://www.interesting-people.org/archives/interesting-people/200006/msg00090.html] on Jan. 21, 2005, dated Jun. 29, 2000.

NetCurrent's web site, retrieved from [URL: http://web.archive.org/web/20000622024845/www.netcurrents.com] on Jan. 17, 2005, archived on Jun. 22, 2000 and Sep. 18, 2000.

Trigaux, Robert, "Cyberwar Erupts Over Free Speech Across Florida, Nation." Knight-Ridder Tribune Business News, May 29, 2000.

Kahn et al, Categorizing Web Documents Using Competitive Learning: An Ingrediant of a Personal Adaptive Agent, IEEE; © 1997.

Nakashima et al, Information Filtering for the Newspaper, IEEE; © 1997.

Adamic et al., The political blogosphere and the 2004 U.S. election: Divided they blog, Proceedings WWW-2005 2nd Annual Workshop on the Weblogging Ecosystem, 2005, Chiba, Japan.

Adar et al., Implicit structure and dynamics of blogspace, Proceedings WWW-2004 Workshop on the Weblogging Ecosystem, 2004, New York, NY.

Aliod, Diego Molla, et al., "A Real World Implementation of Answer Extraction", Department of Computer Science, University of Zurich, Winterthurerstr., 1998, 190, CH-8057 Zurich, Switzerland, pp. 1-6.

Bishop, Mike, "ARROW Question/Answering Systems", Language Computer Corporation, 1999, pp. 1-3.

Archived version of www.bizrate.com, Jan. 1999.

Blum, Avrim, "Empirical support for winow and weighted-majority algorithms: Results on a calendar scheduling domain," in Machine Learning, 1997, pp. 5-23, vol. 26, Kluwer Academic Publishers, Boston, USA.

Bournellis, Cynthia, "Tracking the hits on Web Sites", Communications International. London: Sep. 1995. vol. 22, Issue 9, 3 pages.

Cohen, William W., "Data Integration using similarity joins and a word-based information representation language," in ACM Transactions on Information Systems, Jul. 2000, pp. 288-321, vol. 18, No. 3.

Cohn et al., "Active Learning with Statistical Models", Journal of Artificial Intelligence Research 4 (1996), 129-145, AI Access Foundation and Morgan Kaufmann Publishers, USA.

Dagan et al., "Mistake Driven learning in text categorization," in EMNLP '97, 2nd Conference on Empirical Methods in Natural Language Processing, 1997.

Delahaye Group to Offer Net Bench: High Level Web-Site Qualitative Analysis and Reporting; Netbench Builds on Systems provided by I/PRO and Internet Media Services, 1995 businessWire, Inc., May 31, 1995, 3 pages.

www.dialogic.com as archived on May 12, 2000.

Dillon et al., Marketing research in a Marketing Environment, 1987, Times Mirror/Mosby College, USA, pp. 98, 286, 288.

Farber, Dave. "IP: eWatch and Cybersleuth," Jun. 29, 2000, retrieved from [URL: http://www.interesting-people.org/archives/interesting-people/200006/msg00090.html].

Freund et al., "Selective Sampling Using the Query by Committee Algorithm", Machine Learning 28 (1997), 133-168, Kluwer Academic Publishers, The Netherlands.

Glance et al., Analyzing online disussion for marketing intelligence, Proceedings WWW-2005 2nd Annual Workshop on the Weblogging Ecosystem, 2005, Chiba, Japan.

Glance et al., Deriving marketing intelligence from online discussion, 11th ACM SIGKDD International Conf. On Knowledge Discovery and Data Mining, Aug. 21-24, 2005, Chicago, IL.

Greffenstette et al., "Validating the coverage of lexical resources for affect analysis and automatically classifying new words along semantic axes," Chap. X, Mar. 2004, pp. 1-15.

Harabagiu, Sanda M., "An Intelligent System for Question Answering", University of Southern California; Modlovan, Dan, Southern Methodist University, 2004, pp. 1-5.

Harabagiu, Sanda M. et al., "Experiments with Open-Domain Textual Question Asnwering", Department of Computer Science and Engineering at Southern Methodist Universtity, 2000, pp. 1-7.

Harabagiu, Sanda M. et al., "Mining Textual Answers with Knowledge-Based Indicators", Department of Computer Science and Engineering at Southern Methodist University, 2000, pp. 1-5.

Joachims, Thorsten, "Text categorization with support vector machines: Learning with many relevant features," in Machine Learning: ECML-98, Tenth European Conference on Machine Learning, pp. 137-142, 1998.

Katz, Boris, "From Sentence Processing to Information Access on the World Wide Web: START Information Server", MIT Artificial Intelligence Laboratory, Feb. 27, 1997.

Kleppner, Advertising Procedure, 6th edition, 1977, Prentice-Hall, Inc., Englewood Cliffs, NJ, p. 492.

Kotler, Marketing Management, 1997, PrenticeHall International Inc., Upper Saddle River, NJ, pp. 617-619, 656-658, 665-667.

Lenz, Mario, et al., "Question answering with Textual CBR", Department of Computer Science, Humboldt University Berlin, D-10099 Berlin, pp. 1-12, 1998.

Littlestone, Nick, "Learning quickly when irrelevant attributes abound: A new linear-threshold algorithm," in Machine Learning, 1988, pp. 285-318, vol. 2, Kluwer Academic Publishers, Boston, USA.

Marlow, Audience, structure and authority in the weblog community, International Communication Association Conference, MIT Media Laboratory, 2004, New Orleans, LA.

McCallum et al., "Text Classification by Bootstrapping with the Keywords, EM and Shrinkage", Just Research and Carnegie Mellon U., circa 1999, Pittsburgh, PA, USA.

McLachlan, Geoffrey J. And Krishnan, Thriyambakam, The EM Algorithm and Extensions, Copyright 1997, pp. 1-274, John Wiley & Sons, Inc., New York, USA.

Modlovan, Dan et al., "LASSO: A Tool for Surfing the Answer Net", Department of Computer Science and Engineering at Southern Methodist University, pp. 1-9, 1999.

Nanno et al., Automatic collection and monitoring of Japanese Weblogs, Proceedings WWW-2004 Workshop on the weblogging Ecosystem, 2004, New York, NY.

Pang et al., "Thumbs up? Sentiment classification using machine learning techniques," in Proceedings of EMNLP 2002,2002.

Reinartz, Customer Lifetime Value Analysis: An Integrated Empirical Framework for Measurement and Explanation, dissertation: Apr. 1999, pp. 57-118.

Thomas, International Marketing, 1971, International Textbook Company, Scranton, PA, p. 148.

Tull et al., Marketing Research Measurement and Method, 1984, MacMillan Publishing Company, New York, NY, pp. 102, 103, 114, 115, 200 201 and 256.

Voorhees, Ellen M., "The TREC-8 Question Answering Track Report", National Institute of Standards and Technology, pp. 1-6, 1999.

Wiebe et al., "Identifying collocations for recognizing opinions, in proceedings of ACL/EACL '01 workshop on collcation," (Toulouse, France), Jul. 2001.

Word of Mouth Research Case Study, "The Trans Fat Issue, Analysis of online consumer conversation to understand hwo the Oreo lawsuit impacted word-of-mouth on trans fats.", Aug. 16, 2004, 35 pages.

Yang, Yiming, "An evaluation of statistical approacches to text categorization," Information Retrieval 1 (1/2), pp. 67-88, 1999.

www.zagat.com archived on Apr. 29, 1999.

p. 34 of archived version of www.zagat.com, Feb. 1999.

Official Action dated May 19, 2005, in U.S. Appl. No. 09/695,016, 13 pages.

Official Action dated Nov. 2, 2005, in U.S. Appl. No. 09/695,016, 13 pages.

Official Action dated Feb. 24, 2003, in U.S. Appl. No. 09/796,961, 4 pages.

Housley et al., "Internet X.509 Public Key Infrastructure Certificate and CRL Profile", Jan. 1999, Network Working Group Request for Comments: 2459, pp. 1-129.

European Search Report dated Sep. 26, 2007, directed to counterpart EP application No. 02744622.8, 3 pages.

David L. Chaum, "Untraceable Electronic Mail, Return Addresses, and Digital Pseudonymns", Communication of the ACM, vol. 24, No. 2, 1981, pp. 84-88.

David Chaum & Jan-Hendrik Evertse, "A Secure and Privacy-Protecting Protocol for Transmitting Personal Information Between Organizations", A.M. Odlyzko (Ed.): Advances in Cryptology, Crypto '86, LNCS 263, 1987, pp. 118-167.

Official Action dated Dec. 12, 2004, in U.S. Appl. No. 09/879,220, 15 pages.

Official Action dated Apr. 28, 2005, in U.S. Appl. No. 09/879,220, 16 pages.

Official Action dated Mar. 28, 2006, in U.S. Appl. No. 09/879,220, 19 pages.

Official Action dated Dec. 1, 2006, in U.S. Appl. No. 09/879,220, 3 pages.

Official Action dated Apr. 5, 2006, in U.S. Appl. No. 11/239,632, 9 pages.

Official Action dated Sep. 21, 2006, in U.S. Appl. No. 11/239,632, 3 pages.

Official Action dated Dec. 18, 2006, in U.S. Appl. No. 11/239,632, 3 pages.

Official Action dated Jul. 29, 2008, in U.S. Appl. No. 11/710,743, 12 pages.

Official Action dated Jan. 12, 2009, in U.S. Appl. No. 11/710,743, 17 pages.

Official Action dated Jan. 28, 2005, in U.S. Appl. No. 09/686,516, 19 pages.

Official Action dated Jun. 29, 2005, in U.S. Appl. No. 09/686,516, 21 pages.

Official Action dated Nov. 22, 2005, in U.S. Appl. No. 09/686,516, 25 pages.

Official Action dated May 10, 2006, in U.S. Appl. No. 09/686,516, 34 pages.

Official Action dated Sep. 22, 2006, in U.S. Appl. No. 11/239,696, 11 pages.

Official Action dated Sep. 12, 2007, in U.S. Appl. No. 11/239,696, 8 pages.

Official Action dated Nov. 21, 2007, in U.S. Appl. No. 11/239,696, 3 pages.

Official Action dated Apr. 7, 2006, in U.S. Appl. No. 11/239,695, 9 pages.

Official Action dated Sep. 21, 2006, in U.S. Appl. No. 11/239,695, 3 pages.

Official Action dated Dec. 3, 2006, in U.S. Appl. No. 11/239,695, 3 pages.

Official Action dated Oct. 3, 2007, in U.S. Appl. No. 11/710,742, 10 pages.

Official Action dated Aug. 7, 2008, in U.S. Appl. No. 11/710,742, 12 pages.

Official Action dated Dec. 8, 2008, in U.S. Appl. No. 11/710,742, 10 pages.

Official Action dated Jan. 30, 2009, in U.S. Appl. No. 11/710,742, 10 pages.

Official Action dated Jan. 24, 2007, in U.S. Appl. No. 09/686,516, 3 pages.

Official Action dated Dec. 23, 2008, in U.S. Appl. No. 11/372,191, 6 pages.

IPRP dated Jun. 19, 2007, in WO PCT/US2005/035321, 4 pages.

Official Action dated Aug. 19, 2008, in U.S. Appl. No. 11/517,418, 9 pages.

Official Action dated Jun. 11, 2007, in U.S. Appl. No. 11/364,169, 8 pages.

Official Action dated Apr. 23, 2008, in U.S. Appl. No. 11/364,169, 10 pages.

Official Action dated Jul. 10, 2008, in U.S. Appl. No. 11/364,169, 2 pages.

Official Action dated Sep. 18, 2008, in U.S. Appl. No. 11/454,301, 17 pages.

Official Action dated Apr. 17, 2009, in U.S. Appl. No. 11/454,301, 17 pages.

Official Action dated Mar. 7, 2008, in U.S. Appl. No. 10/801,758, 31 pages.

Official Action dated Oct. 1, 2008, in U.S. Appl. No. 10/801,758, 40 pages.

Official Action dated May 22, 2008, in U.S. Appl. No. 11/897,984, 17 pages.

Official Action dated Nov. 13, 2008, in U.S. Appl. No. 11/897,984, 20 pages.

Official Action dated Jan. 21, 2009, in U.S. Appl. No. 11/897,984, 3 pages.

Official Action dated Apr. 21, 2009, in U.S. Appl. No. 11/897,984, 18 pages.

Official Action dated Oct. 9, 2007, in U.S. Appl. No. 11/245,542, 11 pages.

Official Action dated Jun. 12, 2008, in U.S. Appl. No. 11/245,542, 9 pages.

Official Action dated Aug. 21, 2008, in U.S. Appl. No. 11/245,542, 4 pages.

Official Action dated Oct. 8, 2008, in U.S. Appl. No. 11/245,542, 5 pages.

Official Action dated Dec. 16, 2008, in U.S. Appl. No. 11/245,542, 4 pages.

Official Action dated Dec. 17, 2008, in U.S. Appl. No. 11/517,417, 6 pages.

International Search Report dated Jul. 1, 2008, in WO PCT/US2007/021035, 3 pages.

Official Action dated Jul. 21, 2004, in U.S. Appl. No. 09/695,016, 27 pages.

Notice of Allowance issued in U.S. Appl. No. 11/710,742, mailed Jun. 8, 2009, 10 pages.

Notice of Allowance issued in U.S. Appl. No. 11/517,417, mailed May 29, 2009, 7 pages.

Notice of Allowance issued in U.S. Appl. No. 10/801,758, mailed Apr. 29, 2009, 42 pages.

United States Patent and Trademark Office, "Non-Final Office Action," issued in connection with U.S. Appl. No. 11/710,743, on Aug. 7, 2009 (19 pages).

Reguly, Eric, "Caveat Emptor Rules on the Internet," The Globe and Mail (Canada): Report on Business Column, p. B2, Apr. 10, 1999 (2 pages).

* cited by examiner

SYSTEM AND METHOD FOR SCORING ELECTRONIC MESSAGES

RELATED APPLICATIONS

This application is a continuation of U.S. patent application Ser. No. 09/879,220, filed on Jun. 13, 2001, now U.S. Pat. No. 7,185,065, which, in turn, is a continuation-in-part of U.S. patent application Ser. No. 09/795,968, filed on Mar. 1, 2001 now abandoned, which, in turn, is a continuation-in-part of U.S. patent application Ser. No. 09/686,516, filed on Oct. 11, 2000, now U.S. Pat. No. 7,197,470, which are all herein incorporated by reference in their entirety.

BACKGROUND OF THE INVENTION

The present invention relates generally to electronic communities where individuals interact and exchange communications over local and world-wide networks. More particularly, the present invention relates to electronic identities and reputations established within such electronic communities.

Electronic communities have been used in the art to facilitate communications between two or more people. Electronic communities typically allow for exchange of information, ideas and opinions over an extended period of time, i.e., a discussion about a particular topic may be initiated by an individual posting a message on day one, and subsequent discussion participants may receive, view or respond to the message at a later date. Electronic communities are similar to non-electronic communities in that members of each electronic community can establish a reputation based on their participation within the community. An electronic community generally provides one or more discussion forums and individual forums may be dedicated to particular topics. An electronic discussion forum may allow even participants new to the forum to review past discussion messages and therefore to fully participate in the forum. Well-known examples of such communities and electronic forums include Web-based and proprietary message boards (both public and private), USENET news groups, and electronic mailing lists. These electronic communities and discussion forums support both synchronous and asynchronous discussions, i.e., one or more participants may inject communications into the discussion at the same time, or nearly the same time, without disrupting the flow of communications. This allows each individual electronic discussion forum to be rich with communications spanning a wide variety of topics and subjects.

Other communities and electronic discussion forums may facilitate more traditional asynchronous-like communications by providing, e.g., interactive chat sessions. In these electronic communities and discussion forums, participants are typically online at the same time and are actively responding to messages posted by others. These discussion forums are similar to a traditional telephone discussion in that the information in exchanged in real-time. However, a significant difference is that the electronic discussion forums are, by their nature, written or recorded message transmissions, which may be saved for historical records or for analysis at a future date.

With so many different topics and subjects within each topic, and so many participants, a significant problem arises in attempting to capture and quantify the communications. Moreover, identifying trends and predicting future behavior in certain markets based on the communications has not been possible in the past because of the magnitude of the communications and the magnitude of topics and subjects. Further complicating any analysis of communications in electronic discussion forums is the fact that an individual may easily participate in multiple forums by posting the same message in several different discussion forums, and that individuals may use more than one identity when posting.

Although most electronic communities require each user to select an identity that is unique within a particular community, there has been no coordination among the various communities to allow users to establish a single identity for use within every community. For example, an individual user in the Yahoo.com message boards ("Yahoo community") may have acquired the identity john@yahoo.com. However, because "john" is not very unique, the individual may not be able to use that pseudonym on other communities, such as, e.g., the Amazon.com community. In this example, if the identity john@amazon.com has already been selected by a different individual, then the individual user known as john@yahoo.com would have to select a different pseudonym for use on the Amazon message boards, for example, john2@amazon.com. Essentially, an electronic pseudonym becomes the individual's identity as the user participates in various electronic communities. Thus, this becomes the only way an individual can be referred to within each community or electronic discussion forum.

The resulting problem for users is a lack of continuity of identity across the various electronic forums they participate in. That is, a single individual cannot easily establish an identity and reputation across electronic communities, even when the forums are related to the same topic. In some instances, a user may prefer such separation of identities across different electronic communities. For example, a user may wish to participate in one set of communities devoted to financial markets, and another set of communities devoted to building model aircraft. Because the there is little relationship between these sets of communities, the user may not desire establishment of a cross-community identity and reputation across both community sets. However, within each set of communities, the user may desire such a cross-community identity. That is, for example, within the various model aircraft communities, the user may wish to build a reputation as a user that provides useful information. Without a way to create a cross-community identity, the user would only be able to establish a plurality of independent reputations, that is, one for each community, with no relationship to each other.

SUMMARY OF THE INVENTION

The system and method of the present invention allows collection and analysis of electronic discussion messages to quantify and identify trends in various markets. Message information data is collected and becomes a time series stored in a database, indicating the identity or pseudonym of the person posting the message, the contents of the message and other data associated with the message. This data is analyzed to identify when new participants enter and leave the discussion and how often they participate. Calculation of summary statistics describing each community's behavior over time can also be made. Finally, identification of patterns in this data allows identification of pseudonyms who play various roles in each community, as described below.

The system of the present invention comprises an electronic discussion data system, a central data store and a data analysis system. The electronic discussion data system may comprise a message collection subsystem as well as message categorization and opinion rating subsystems. The message collection subsystem interfaces with a plurality of pre-determined electronic discussion forums to gather message information. The message categorization subsystem analyzes the message information and categorizes each message according to a plurality of pre-determined rules. Additionally, the message categorization subsystem can perform detailed analysis of the behaviors exhibited by the posting pseudonyms within a community, forum or thread. The opinion rating subsystem further analyzes the message information and assesses an opinion rating according to a plurality of pre-determined linguistic and associative rules. The central data store of the present invention comprises one or more non-volatile memory devices for storing electronic data including, for example, message information, results of analyses performed by the system and a plurality of other information used in the present invention. In a preferred embodiment, the central data store further comprises a relational database system for storing the information in the non-volatile memory devices. The data analysis system of the present invention may comprise an objective data collection subsystem, an analysis subsystem, and a report generation subsystem. The objective data collection subsystem interfaces with a plurality of pre-determined objective data sources to collect data which may be used to establish trends and correlation between real-world events and the communication expressed in the various electronic discussion forums. The analysis subsystem performs the analysis of the objective data and message information described above. The report generation subsystem generates reports of the analysis to end-users. The reports may comprise pre-determined query results presented in pre-defined report formats or, alternatively may comprise ad hoc reports based on queries input by an end-user of the system.

The method of the present invention comprises one or more of the steps of collecting a plurality of message information from a plurality of pre-determined electronic discussion forums; storing the plurality of message information in a central data store; categorizing the message information according to a plurality of pre-determined rules; categorizing the behavior exhibited by the pseudonyms within each community, forum or thread; assigning an opinion rating to the plurality of message information based on a plurality of pre-determined linguistic patterns and associative rules; collecting a plurality of objective data from a plurality of objective data sources; analyzing the message information and the objective data to identify trends in the pattern of behavior in pre-determined markets and the roles of participants in electronic discussion forums; and generating reports for end-users of the method based on the results of the analyses performed by the present invention.

The present invention also provides a system and method for establishing and evaluating cross community identities in electronic communities and discussion forums. The system and method comprise a scheme allowing users to select and register a universal pseudonym which can then be associated with the various local pseudonyms required on each electronic forum. The electronic message postings by a user can be evaluated across the electronic forums to establish a reputation within the communities to which the universal pseudonym relates. This allows the user to establish a reputation not just within a single electronic forum, but also across multiple communities or forums.

DEFINITIONS

Figure 1:
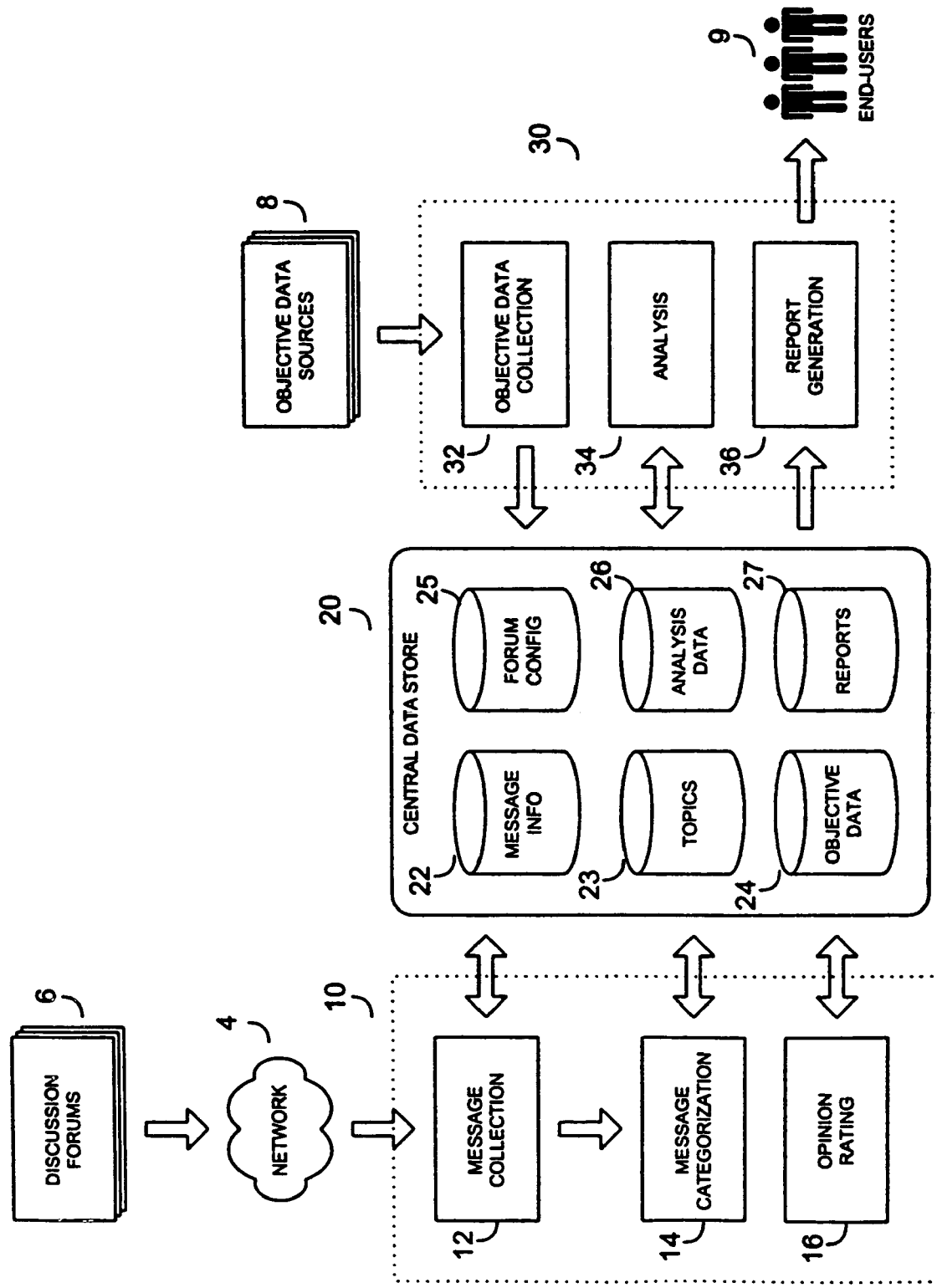
FIG. 1 is a schematic diagram of the system architecture employed in a preferred embodiment of the present invention.

Community—a vehicle supporting one or more electronic discussions, such as a message board, mailing list, or Usenet newsgroup.

Discussion Forum—an area of a community where discussions directed to a particular theme occur. Examples of discussion forums include the Amazon message board in the Yahoo.com community and the Usenet newsgroup rec.arts.movies.current-films.

Message—the text and associated information posted to discussion forums, also referred to herein as "electronic message".

Topics—the themes intended for discussion in a discussion forum by a particular community.

Subject—the contents of the "Subject" field in an electronic message posted in an electronic discussion (as distinct from topics).

Discussion Thread—A series of messages posted within a single forum generally in response to earlier posted messages. Discussion threads typically have the same subject, or were generally created as a "reply to" an earlier message.

Local Pseudonym—an e-mail address, alias, or other unique handle, i.e., name, used by a participant in an electronic community or discussion forum. A local pseudonym is an end-user's identity in a particular community.

Universal Pseudonym—an e-mail address, alias, or other handle used by a participant to associate various local pseudonyms together, enabling the user to establish a cross-community identity. A universal pseudonym is essentially a virtual identity composed of one or more local pseudonyms.

Source—the issuer of a pseudonym, such as an e-mail host, or the community service provider.

Message Body—the portion of an electronic message comprising the pseudonym's contribution to the electronic discussion forum. The message body generally comprises the data, opinions or other information conveyed in the electronic message, including attached documents, files and/or parts of, or entire, previous messages.

Header Information—the portion of an electronic message not including the message body. Header information generally comprises information related to: the transmission path, time/date stamp, the message poster's identity, the message identification number ("message ID"), the message subject.

Buzz Level—for a community or discussion forum, a measure of general activity within the community or forum, as determined by the number of distinct pseudonyms posting one or more messages over a given time frame.

Connectivity—for a community, a measure of its relatedness with other communities, as determined by the number of other communities in which a community's participants concurrently participate.

Actor—descriptive name of the role that a pseudonym (local or universal) plays in the social networks of communities. Actors can be further classified according to the following definitions:

Initiator—a pseudonym that commences a discussion, i.e., one that posts the first message leading to subsequent responses forming a dialog on a particular subject.

Moderator—a pseudonym that ends a discussion, i.e., one that posts the final message closing the dialog on a particular subject.

Buzz Accelerator—a pseudonym whose postings tend to precede a rising buzz level in a community.

Buzz Decelerator—a pseudonym whose postings tend to precede a falling buzz level in a community.

Provoker—a pseudonym that tends to start longer discussion threads; different from buzz accelerators in that the metric is one discussion thread, not the community's overall discussion level.

Buy Signaler—a pseudonym whose postings on a topic tend to precede a rising market for that topic.

Sell Signaler—a pseudonym whose postings on a topic tend to precede a falling market for that topic.

Manipulator—a pseudonym with little posting history except as manipulators, whose combined postings on one topic elevate the buzz level in the absence of external confirming events.

Connector—a pseudonym who posts messages related to a large number of different topics or in a large number of different communities.

Mood—a positive/negative measure derived from analysis of the patterns of actors' behavior.

Topic—the subject that is being discussed in an electronic community or forum. Many communities have designated one topic per discussion forum. Other communities may designate multiple topics for their forums.

Relevance Score—a measure of the degree to which a message is relevant to the electronic discussion forum's designated topic or topics. A relevance score may also be assigned to measure the degree to which a message is relevant to a particular thread. An Actor's relevance score measures the degree to which, on average, the Actor posts relevant messages with respect to the discussion forum's designated topic or topics. A discussion forum's relevance score measures the degree to which, on average, the forum's participants post relevant messages with respect to the forum's designated topic or topics.

Impact Score—a measure of the degree to which a message alters the behavior of other participants within an electronic community, discussion forum, or thread. An Actor's impact score measures the degree to which, on average, the Actor posts messages with high impact. A discussion forum's impact score measures the degree to which, on average, the forum's participants post messages with high impact.

Influence Score—for individuals, a measure of a pseudonym's potential to affect the views and opinions of other participants within an electronic discussion forum. Similarly, for communities, an influence score is a measure of the degree that recent messages within the community exhibit influence. An influence score is based on a pseudonym's tendency to discuss relevant topics, as well as its impact on that community or discussion. Influence builds on the concepts of relevance and impact by adding a time component, requiring pseudonyms to maintain their influence score over time.

Buzz—a measure of the level of activity within an electronic discussion forum, community, or other group, based on the number of messages that has been posted, weighted by the influence of the authors and relevance of the messages.

Migration—a measure of the movement of pseudonyms and/or influence-weighted posting activity into ("inflow"), or out from ("outflow"), an electronic discussion forum, community, or other group.

Flame—a message determined to be off-topic and emotional.

DETAILED DESCRIPTION OF THE INVENTION

In a preferred embodiment, the present invention is implemented using a system architecture as shown in FIG. 1. The system architecture comprises electronic discussion data system 10, central data store 20, and analysis system 30. Electronic discussion data system 10 interfaces via network 4 with selected electronic discussion forums 6 to collect electronic messages and analyze intrinsic data comprising the messages according to one aspect of the present invention. Network 4 may be any communications network, e.g., the Internet or a private intranet, and may use any suitable protocol for the exchange of electronic data, e.g., TCP/IP, NNTP, HTTP, etc. Central data store 20 is a repository for electronic messages collected, objective data gathered from external sources and the results of the various analyses or reports produced by the system and method of the present invention. Central data store 20 may be implemented using any suitable relational database application program, such as, e.g., Oracle, Sybase and the like. Data analysis system 30 receives input from selected objective data sources for use in analyzing and quantifying the importance of the electronic discussion messages collected, and provides computer programming routines allowing end-users 9 to generate a variety of predefined and ad hoc reports and graphical analyses related to the electronic discussion messages. Each of the main systems comprising the system architecture of the present invention is described in more detail below.

Central Data Store

Central data store 20 comprises one or more database files stored on one or more computer systems. In a preferred embodiment, central data store 20 comprises message information database 22, topics database 23, objective data database 24, forum configuration database 25, analysis database 26 and reports database 27, as shown in FIG. 1. Message information database 22 comprises the message information collected by message collection subsystem 12. In a preferred embodiment, message information database 22 comprises: a message ID, i.e., a number or other string that uniquely identifies each message within a community or forum; sender information, i.e., the local pseudonym, e-mail address or name of each message's author; a posting time and date for each message (localized to a common time zone); a collection time and date for each message; a subject field, i.e., the name of the thread or subject of each message; the message body for each message; an in-reply-to field, i.e., the message ID of the message to which each message was a reply; and the source of the message.

The function and content of central data store 20's database files 23-27 are described in subsequent sections below.

Electronic Discussion Data System

As discussed above, electronic discussion data system 10 gathers certain messages and analyzes them according to the intrinsic information comprising the messages. Electronic discussion data system 10 comprises three subsystems: message collection subsystem 12, message categorization subsystem 14 and opinion rating subsystem 16. Message collection subsystem 12 collects message information from data sources and stores the information in central data store 20 for later analysis. Message categorization subsystem 14 extracts information about each message in central data store 20 and categorizes the messages according to a plurality of predefined topics. The subsystem analyzes all aspects of each message and determines if the message is relevant to one or more of the topics that the system is currently tracking. A relevancy ranking for each message is stored in central data store 20 for each topic indicating the strength of the message's relation to each topic. Further analysis of the collected message information is carried out by opinion rating subsystem 16 to determine whether the message conveys a positive, neutral or negative opinion regarding the related topic. Each of the subsystems of electronic discussion data system 10 are described in more detail below.

Message Collection Subsystem

Figure 2:
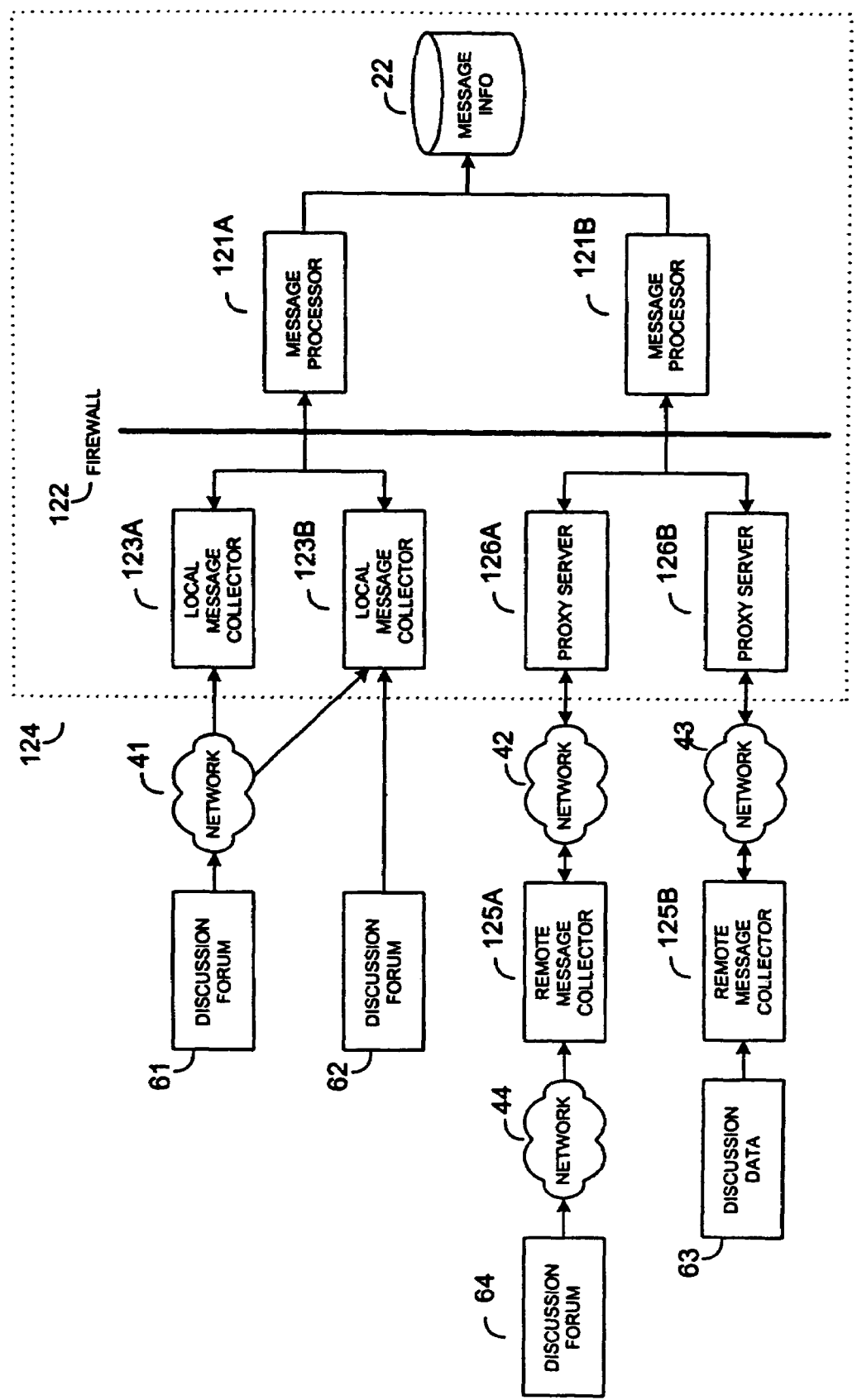
FIG. 2 is a schematic diagram of a message collection subsystem implemented in a preferred embodiment of the present invention.

Message collection subsystem 12 collects electronic message information from the designated electronic discussion forums and passes the collected messages to central data store 20 and to message categorization subsystem 14, as shown in FIG. 1. The collected messages comprise records stored in message information database 22 in central data store 20. Database 22 comprises records including message header information and the message body. In a preferred embodiment, each field comprising message header information comprises a separate field of a record in database 22. The architecture used in a preferred embodiment of the present invention for implementing message collection subsystem 12 is shown in the schematic diagram in FIG. 2. This architecture supports multiple configurations for data collection and is highly scalable for gathering large or small amounts of message information. FIG. 2 illustrates some of the configurations that may be used in a preferred embodiment of message collection subsystem 12.

As shown in FIG. 2, the message collection subsystem consists of several components that function together to collect information from electronic discussion forums 61 and 62 or discussion data files 63 and 64 on distributed networks 41-44. Although shown as separate discussion forums, data files and networks, it would be apparent to one skilled in the art that discussion forums 61 and 63 and data files 63 and 64 could be the same discussion forum or data file, and networks 41-44 could comprise a single distributed network, such as the Internet. Components of message collection subsystem 12 include message collector programs and message processor programs running on one or more computer systems. The computer systems used by message collection subsystem 12 comprise any suitable computers having sufficient processing capabilities, volatile and non-volatile memory, and support for multiple communications protocols. In a preferred embodiment, the computer systems used by message collection subsystem 12 comprise UNIX-based servers such as available from Sun Microsystems, or Hewlett-Packard and the like. All of the subsystem components can be replicated within a single computer system or across multiple computer systems for overall system scalability.

In a preferred embodiment, message processor programs, e.g., message processor 121a and 121b, are in communication with database 22, which is part of central data store 20 (not shown in FIG. 2). In FIG. 2, the message processors and central data store are protected from unauthorized access by firewall security system 122. Other components of message collection subsystem 10 are located at various points in the architecture, as described below. As would be apparent to one of ordinary skill in the art, firewall 122 is provided for security and is not technologically required for operation of the present invention. Message processors 121a and 121b receive information from the message collectors and store the information in the database 22 for later processing. As shown in FIG. 2, message processors 121a and 121b may service more than one message collector program to facilitate processing of a large volume of incoming messages. Inbound messages are held in a queue on the message processors, allowing message processors 121a and 121b to receive many more messages from the message collectors than they can actually process for storing in database 22. This architecture allows the rapid collection of millions of messages from tens of thousands of discussion forums without excessive overloading of the computer systems.

In a preferred embodiment, the message information collected by message collection subsystem 12 may comprise one or more of the following attributes which are recorded at collection time for use in subsequent analysis by other subsystems of the present invention:

Posting date and time—the date and time the message was posted to the electronic forum. In a preferred embodiment, the date and time indicated by the electronic forum is normalized to reflect the time in a standardized time zone, for example, EST or GMT.

Collection date and time—the date and time the message was collected.

Poster's information—the local pseudonym that posted the message, including any available information such as, e.g., the poster's email address, handle, and community-specific identifiers.

Community—the community in which the message was posted.

Forum—the forum in which the message was posted.

Subject—the subject line of the message, as defined above.

Message ID—the message's unique ID within the community or forum.

Body—the message body as defined above.

Message length—the length of the message, measured in, for example, bytes, characters, lines, or other objective means to indicate message length.

Thread—if a message belongs to a thread, the thread is recorded. In a preferred embodiment, each message's immediate parent, and the original thread parent is stored and is sufficient to reconstruct the thread.

Influence score of the local pseudonym—the influence score of the posting local pseudonym at the time of posting, if one has been previously determined.

Reputation score of the universal pseudonym—the reputation score of universal pseudonym associated with the posting local pseudonym at the time of posting, if one has been previously determined.

As is known in the art, each discussion forum or data file may have a unique message format. For example, an electronic message from one discussion forum may place the date field first, the message ID second, and the other header and body data last. A different discussion forum may choose to display the message ID first, followed by the local pseudonym of the participant, and the message body. Moreover, each type of discussion forum has its own communications protocol. For example, the communications protocol for an interactive discussion forum (e.g., a chat session) is not the same as the communications protocol for USENET news groups. The message format and protocols need not be static, i.e., as discussion forums evolve, different data structures and protocols may be implemented. To accommodate such changes, each message collector receives configuration information from forum configuration database 25 in central data store 20, either directly or via the message processor systems. The configuration information indicates the data source, i.e., the discussion forum or discussion file, from which messages will be collected. The configuration information further comprises programming instructions tailored for each individual data source to allow the message collector program to communicate with the data source and extract and parse the message information. Accordingly, message collectors can support a wide variety of protocols utilized by discussion forums including, e.g., HTTP, NNTP, IRC, SMTP and direct file access. In a preferred embodiment, the general programming instructions are written the Java programming language with parsing instructions written in Jpython scripting language. By storing the configuration information in a centralized location, i.e., central data store 20, management of the message collectors is simplified. Accordingly, when the data structure for a particular discussion forum changes, the configuration information needs to be modified only once.

To ensure compatibility with various computer systems, the message collector programs are written utilizing any suitable programming languages, preferably Java and JPython scripting languages. This allows the collector programs to be easily ported across a wide variety of computer operating systems. Moreover, the message collector programs are designed to have a minimal processing footprint so that they can reside on computer systems that are hosting other critical functions.

As noted above, there are several ways to implement the architecture supporting message collection subsystem 12. In one implementation, message collector programs, shown in FIG. 2 as local message collectors 123a and 123b, are part of local area network ("LAN") 124 and are authorized access through firewall 122. Local message collector 123a interfaces through network 41 to collect messages from discussion forum 61 and local message collector 123b has direct access to discussion data file 63. The latter configuration may be implemented, e.g., if the operator of message collection subsystem 12 also hosts a community for message discussion forums. As shown in FIG. 2, a message collector may collect messages from multiple discussion forums. For example, as shown in FIG. 2, local message collector 123b also interfaces through network 41 to collect messages from discussion forum 61.

In an alternative implementation, message collector programs, such as remote message collectors 125a and 125b, are run on external networks. As shown in FIG. 2, the remote message collectors are not part of LAN 124 and do not have direct access to the message processor programs running behind firewall 122. For security reasons, proxy servers 126a and 126b are used to interface with message processor 121b through firewall 122. Functionally, remote message collectors operate in the same manner as the local message collectors. That is, remote message collectors 125a and 125b receive configuration information from central data store 20 (via proxy servers 126a and 126b, respectively). Moreover, remote message collectors may collect messages from discussion forums over a network or directly from discussion data files, as shown in FIG. 2. Use of remote message collectors allows for geographic distribution and redundancy in the overall message collection subsystem architecture.

Message Categorization Subsystem

As known in the art, the actual message topic may not be reflective of the topic assigned to the electronic forum in which a message was posted. Message categorization subsystem 14 analyzes the data collected from discussion forums and categorizes the messages into meaningful groupings, i.e., parent topics and topics, according to predefined rules as described below. In a preferred embodiment, message categorization subsystem 14 retrieves message information from database 22 and topic information from central data store 20 and stores results of the categorization process in database 22. Alternatively, message categorization subsystem 14 may receive input directly from message collection subsystem 12 for immediate processing into categories.

Figure 3:
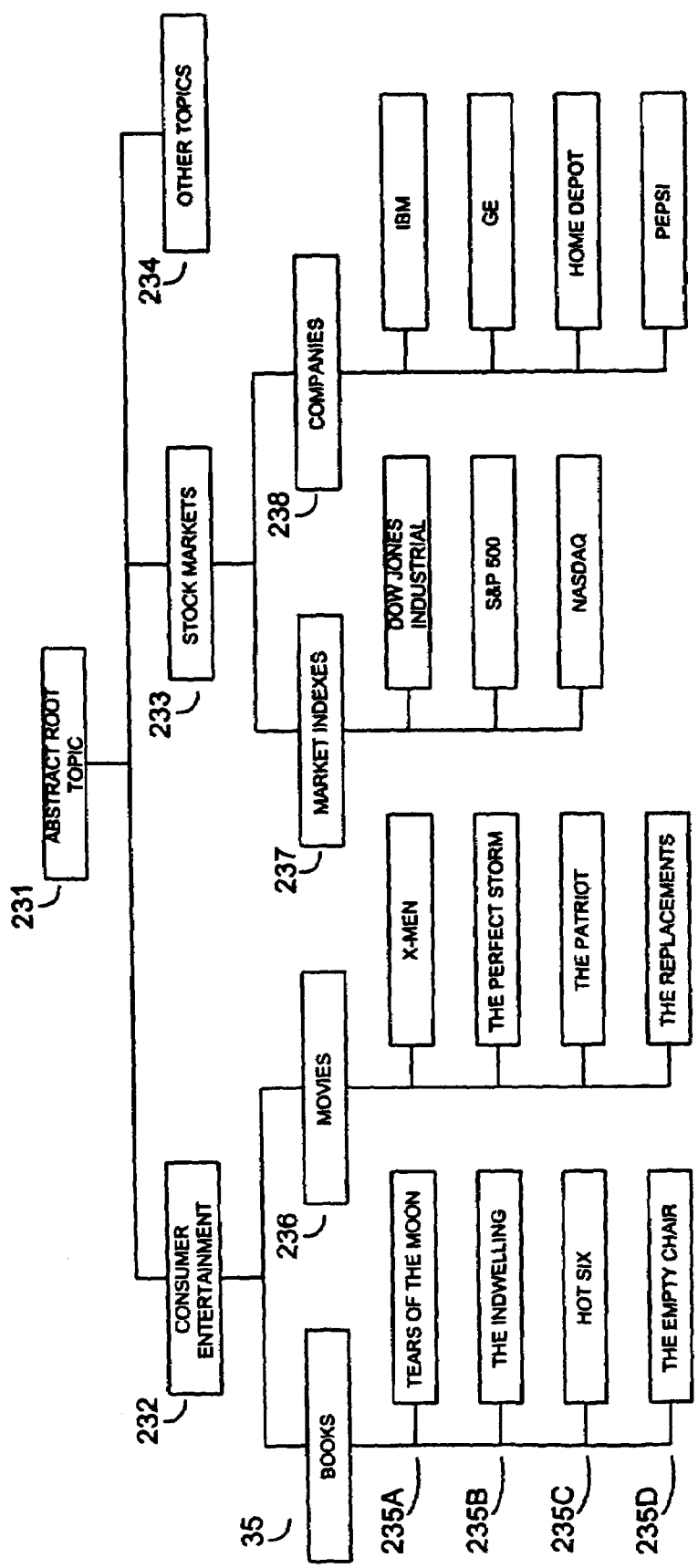
FIG. 3 is a schematic diagram of the hierarchy used to categorize messages in a preferred embodiment of the present invention.

Topics database 23 comprises representations of real world topics that are being tracked and analyzed by the system and method of the present invention. FIG. 3 shows the hierarchical data structure used in a preferred embodiment of database 23. In a preferred embodiment, abstract root 231, shown in FIG. 3 as the top-level of the hierarchy, is not an actual topic stored in database 23 and is shown only to illustrate the hierarchy. Similarly, branches 232-234 are shown in FIG. 3 to conceptually show the relationship between topics stored in database 23. Accordingly, branch 232 indicates that some topics stored in database 23 may relate consumer entertainment, branch 233 indicates other topics relate to stock markets, and branch 234 may include other topics, such as, e.g., food, sports, technology adoption, and the like. As shown in FIG. 3, the hierarchy comprises one or more parent topics, such as parent topics 235 (related to books), parent topic 236 (related to movies), parent topic 237 (related to market indexes) and parent topic 238 (related to companies). Topics in the hierarchy are the last level, such as, topic 235a (Tears of the Moon), topic 235b (The Indwelling), topic 235c (Hot Six) and topic 235d (The Empty Chair). As shown in FIG. 2, topics 235a-235d are related to each other by parent topic 235 (books).

In a preferred embodiment of the present invention, message categorization subsystem 14 assigns a relevance score for each topic to each message collected by message collection subsystem 12. The relevance score is determined based on a set of predefined rules stored in database 23 for each topic. The rules comprise a series of conditions defining information relevant to the topic, having an associated weighting to indicate the strength a particular condition should have in determining the overall relevance rank of the message with respect to a topic. Messages that need categorization are processed by message categorization subsystem 14 synchronously, i.e., the rules for each topic are applied to each message regardless of the relevance score for prior topics analyzed. The elements of each message, including e.g., subject, source, and content are processed against the conditions of each topic in the database. Based on the conditions that are satisfied and the weights of those conditions, a relevance score for each topic is assigned to each message. As messages are processed, their relevance score for each topic is updated in message information database 22 in central data store 20. Relevance scores are described herein after in greater detail.

An example of the rules which may be processed by message categorization subsystem 14 is presented in Table 1, below. In this example, the topic is "The Perfect Storm" which, as shown in FIG. 3, is under the parent topic "Movies."

The conditions for determining the relevance ranking for each message in this example are shown in Table 1, below.

TABLE 1

| Condition | Weight |
| --- | --- |
| Message originated from Yahoo movie discussion forum. | 10 |
| Message subject contains "The Perfect Storm" | 90 |
| Message subject contains "Perfect Storm" | 80 |
| Message body contains "The Perfect Storm" | 50 |
| Message body contains "The Perfect Storm" and "George Clooney" | 90 |
| Message body contains "Warner Brothers" and "Barry Levinson" | 75 |

The number, nature and weights for conditions used to determine the relevancy ranking for each topic depends on the nature of the topic itself. The accuracy of the relevancy ranking assigned can be increased by refining the conditions and weights after analysis of the results obtained by the system. For example, analysis of the results in the above example may show that an additional condition, such as "Message originated from Yahoo movie discussion forum and message subject contains "Perfect Storm"" should be included in the rules and have a weight of 99. If subsequent analysis provides refined rules, message categorization subsystem 14 may be re-run against each message in database 22 to update the relevancy rankings, if desired.

In addition to determining the actual message topic for a message, message categorization subsystem 14 may compute additional message attributes such as:

Thread length—the number of messages in the thread the message belongs to at the time the attribute is computed. This attribute can change over time and if computed, should be periodically updated to reflect new messages posted to the forum.

Position in thread—the message's position within its thread. Position could be expressed as a location, e.g., first, second, third, etc., message in the thread or some other expression reflecting the order of message's occurrence in the thread.

Relevance score—an indication of whether the message is truly relevant to the intended topic, i.e., whether the message's actual topic is related to the forum's designated topic or in the case of a thread, the thread's topic. The actual message topic and the strength of the score used to determine the topic, as described above, are used to establish a relevance score. In a preferred embodiment, the relevance score is computed as a numeric value from 0.0 to 1.0, with a score of 0.0 indicating no connection between the message's actual topic and the forum's (or thread's) topic and a score of 1.0 indicating the message is fully relevant. Because a particular forum may have multiple topics, more than one relevance score may be computed. In a preferred embodiment, the message is assigned the highest computed relevancy score.

In a preferred embodiment, the relevance score for a message is computed using a textual pattern analysis software, such as available from Verity Inc, of Mountain View, Calif.

Impact score—an indication of the message's impact on the discussion forum. In a preferred embodiment, the impact score is computed as a numeric value from 0.0 to 1.0, with a score of 0.0 indicating the message had no impact on discussion behavior and a score of 1.0 indicating the message had great impact on the discussion. In one embodiment, the impact score can be based on the rate of new postings to the forum immediately following the posting of the message compared to the rate of new posting immediately prior the posting of the message. In another embodiment, the impact score measures changes in the number of pseudonyms participating in a discussion after the message has been posted versus before. In a preferred embodiment, irrelevant, or off-topic messages i.e., messages with a low relevance score, receive an impact score of zero, while highly relevant, or on-topic messages i.e., messages with a high relevance score, receive two impact scores: "impact score" I, measures impact using all messages posted in the forum; and "relevant impact score" Ir, measures impact using only relevant messages posted in the forum. In another preferred embodiment, the impact score is measured not only on the change in message traffic experienced in the forum, but also may incorporate changes in the number of threads, the reputation assigned to replying pseudonyms, changes in message vocabulary and style, and changes in topics for messages posted to the forum after the message has been posted.

In a preferred embodiment, a message's impact scores can be computed as follows. For every message, compute window of time T that the message's impact will be measured over. For a given message m, T is the amount of time it took for p unique pseudonyms to post a message before the current message, excluding the poster of m. Next, determine Pa, which is the number of unique pseudonyms that post a message during time T after m. Next, determine Pb, which is the number of unique pseudonyms that post a message during time T before m. Using these values, the impact score, I, for the given message is:

$$I = \left|\frac{Pa - Pb}{Pa + Pb}\right|$$

Similarly, in a preferred embodiment, a message m's relevant impact score, $I_r$, is:

$$I_r = \left|\frac{P_r a - P_r b}{P_r a + P_r b}\right|,$$

where, $P_r a$ is the number of unique pseudonyms that post a relevant message during time $T_r$ after m, $P_r b$ is the number of unique pseudonyms that post a relevant message during time $T_r$ before m, where $T_r$ is the amount of time it took for p unique pseudonyms to post a relevant message before the current message, excluding the poster of m.

In a preferred embodiment, times T and Tr are bounded by a predefined minimum and maximum to keep the calculations stable. Without such bounding, extremely active forums could accumulate p unique pseudonyms so fast that the results we could be very volatile. On the other hand, extremely inactive boards could take a very long time to accumulate p unique pseudonyms.

EXAMPLE

Table 2 below illustrates a representative set of messages posted to an electronic discussion forum. In the table, the current message, c, was posted at time=11, and was posted by a user with the local pseudonym "A4." Applying the above formulas for p=3, I and $I_r$ can be calculated for message m as follows:

a) T=3 time units (the first unique pseudonym, A2, posted a message at time=10, the second unique pseudonym, A4, posted a message at time=9, and the third unique pseudonym, A3, posted a message at time=8, so it took from time=8 to time=11 to get three unique pseudonyms prior to message c), Pa=3 unique pseudonyms (during the three time units following message m, three unique pseudonyms, A3, A4 and A2, posted messages), Pb=2 unique pseudonyms (during the three time units before message m, only two unique pseudonyms, A3 and A2, posted messages), therefore I=⅕.

b) $T_r$=5 time units (the first unique pseudonym, A2, posted a relevant message at time=10, the second unique pseudonym, A4, posted a relevant message at time=9, and the third unique pseudonym, A3, posted a relevant message at time=6, so it took from time=6 to time=11 to get three unique pseudonyms posting relevant messages prior to message c), $P_r a$=2 unique pseudonyms (during the five time units following message m, two unique pseudonyms, A4 and A2, posted relevant messages), $P_r b$=1 unique pseudonyms (during the five time units before message m, only one unique pseudonym, A3 posted a relevant message), therefore $I_r$=⅓.

TABLE 2

| Time | Msg Id | Pseudonym | Relevant to Topic? |
|---|---|---|---|
| 0 | e | A1 | Yes |
| 1 | f | A2 | Yes |
| 2 | g | A1 | No |
| 3 | h | A3 | Yes |
| 4 | i | A3 | No |
| 5 | j | A2 | No |
| 6 | k | A3 | Yes |
| 7 | m | Am | Yes |
| 8 | n | A3 | No |
| 9 | o | A4 | Yes |
| 10 | p | A2 | Yes |
| 11 | c | A4 | No |

Influence score—a measure of a particular local pseudonym's potential to affected other pseudonyms participating in a community, forum or thread. The influence score, F, assigned to a pseudonym is a function of the relevance and impact scores assigned to messages posted by the pseudonym. The relevant influence score, $F_r$, assigned to a pseudonym is a function of the relevance and relevant impact scores assigned to messages posted by the pseudonym. A community can also be assigned influence scores which measure the degree that recent message, within the community exhibit influence. In a preferred embodiment, influence and relevant influence scores are set to decay over time so that pseudonyms that stop posting messages in electronic forums will loose their influence over time.

In a preferred embodiment, each pseudonym receives an influence score, F, based on the impact and relevance scores for the messages that they author. In a preferred embodiment, influence is computed daily, and is based on historic message scores for the set of messages authored by a given pseudonym. Also, in a preferred embodiment, influence scores will be decayed according to the following function:

$$d = e^{\left(\frac{t_m - t}{\tau}\right)}$$

where $t_m$ is the date and time the message was posted, t is the current system date and time, and $\tau$ is a configurable constant that controls the rate of decay. For a given value of $\tau$, there is a maximum ($t_m$−t), that will be considered significant, such that the result of the decay function above is >=0.001.

For a given pseudonym, the influence score, F, is:

$$F = a \cdot \sum_{i=1}^{n} (Rel_i \cdot d_i) + b \cdot \sum_{i=1}^{n} (I_i \cdot d_i)$$

where n is the number of messages authored by the pseudonym that were posted within the influence window, Rel is the relevance score for a message, I is the impact score of a message, d is the time decay function for a message, as defined above, and a and b are configurable constants that control the weightings of relevance and impact.

Similarly, for a given pseudonym, the relevant influence score, $F_r$, is:

$$F = a \cdot \sum_{i=1}^{n} (Rel_i \cdot d_i) + b \cdot \sum_{i=1}^{n} (I_{r_i} \cdot d_i)$$

where n is the number of messages authored by the pseudonym that were posted within the influence window, Rel is the relevance score for a message, $I_r$ is the impact score of a message, d is the time decay function for a message, as defined above, and a and b are configurable constants that control the weightings of relevance and impact.

Moreover, in a preferred embodiment, a community or forum may be assigned an influence score F, which is computed in the same way as for pseudonyms, where the measured message set is defined by the messages that belong to the given community or forum.

Reputation score—a measure of the reputation a particular universal pseudonym possesses within a community, forum or thread. The reputation score, R, assigned to a pseudonym is a function of the influence scores assigned to local pseudonym associated with the universal pseudonym. The relevant reputation score, $R_r$, assigned to a pseudonym is a function of the relevant influence scores assigned to local pseudonym associated with the universal pseudonym. In a preferred embodiment, reputation scores are set to decay over time so that if a user with a universal pseudonym stops posting messages with associated local pseudonyms in electronic forums, reputation will be lost over time.

In a preferred embodiment, a universal pseudonym's reputation score, R, is computed as follows:

$$R = \frac{\sum_{i=1}^{P} (F_i \cdot n_i)}{\sum_{i=1}^{P} (n_i)}$$

where P is the number of local pseudonyms associated with the universal pseudonym, F is the influence score for a given local pseudonym, and n is the number of messages used to compute the local pseudonym's influence score.

Similarly, a universal pseudonym's relevant reputation score, $R_r$, is computed as follows:

$$R_r = \frac{\sum_{i=1}^{P} (F_{r_i} \cdot n_i)}{\sum_{i=1}^{P} (n_i)}$$

where P is the number of local pseudonyms associated with the universal pseudonym, $F_r$ is the relevant influence score for a given local pseudonym, and n is the number of messages used to compute the local pseudonym's influence score.

Leadership score—a measure of a particular pseudonym's tendency to lead or follow a discussion within a forum or thread. The leadership score, L, assigned to a pseudonym can be thought of as a measure of the degree to which a pseudonym is an early participant in current discussions in the forum. Similarly, the relevant leadership score, $L_r$, assigned to a pseudonym can be thought of as a measure of the degree to which a pseudonym is participating in current discussions in the forum by posting relevant messages. In a preferred embodiment, the number of threads that a pseudonym posts to is weighted more heavily than the pseudonym's raw number of posts in the discussion forum. This removes the effect of one-on-one and repetitive conversations within threads which may generate substantial message traffic, but does not lead to greater involvement among other group participants. The leadership score can be assigned based on a variety of factors, such as, the number of threads in which the pseudonym participates, the location of the pseudonym's postings in the threaded discussion, i.e., the earlier the pseudonym posts messages in a threaded discussion, the higher the leadership score will be.

In a preferred embodiment, a pseudonym's leadership score, L, is the sum of the minimum location in each thread posted to, divided by the sum of the length of each thread posted to:

$$L = \sum_{i=1}^{P} \frac{Min_i}{T_i}$$

where for each thread in the forum for which the pseudonym posts messages, Min is the location in the thread of the pseudonym's earliest posting, T is the length of the thread, and P is the number of threads being considered in the computation.

Similarly, in a preferred embodiment, a pseudonym's relevant leadership score, $L_r$, is computed as follows:

$$L_r = \sum_{i=1}^{P} \frac{Min_{ri}}{T_{ri}}$$

where for each thread in the forum for which the pseudonym posts messages, $Min_r$ is the location in the thread of the pseudonym's earliest relevant posting and $T_r$ is the length of the thread.

Finally, message categorization subsystem 14 may compute aggregated attributes for groups (also referred to herein as "sets") of messages within a community, topic, forum or thread. A set could also comprise a group of messages posted in a forum by a single local pseudonym, or a group of messages posted on multiple forums by a user having a universal pseudonym with associated local pseudonyms on each forum. Such aggregate attributes include for example the following:

Last post date and time—date and time of the last post in the set.

Number of posters—total number of pseudonyms used by those posting messages in the set.

Distribution of posts—a breakdown of the distribution of posters ands messages in the set, i.e., an indication of whether or not most of the messages in the set come from a small number of pseudonyms.

Number of posts—the total number of posts in the set.

Number of threads—the number of unique threads (or subjects, if threading is unavailable) within the set of posts.

Set relevance score—an indication of number of messages found to be relevant, i.e., on topic, for the forum in which they were posted. In a preferred embodiment, the set relevance score is determined by computing the average relevance score of messages in the set, for a given date or number of messages.

Set impact score—aggregate impact and relevant impact scores can be determined by computing the average impact or average relative impact of the specified message set. For more granularity, these scores can be computed for messages posted on a given date or for a number of messages selected from the set.

Set flame score—the percentage of messages found to be not relevant, i.e., not on topic, for the forum in which they were posted.

If messages are added to a set after any of the above attributes are computed, the attributes can be recomputed to update the aggregated attribute.

Buzz score—According to an embodiment, the aggregated attributes that message categorization subsystem 14 computes include a so-called "raw buzz score" and "relative buzz score." The raw buzz score provides an influence-weighed measure of posting activity in a forum, community or other entity corresponding to a set of messages. In other words, the raw buzz score provides an indication of activity, based on postings by influential pseudonyms. Preferably, the raw buzz score is a function of the number of messages in the discussion (e.g., a forum or several forums) weighted by the relevance scores of the messages and the influence scores (or relative influence scores) of the authors of the messages. Thus, postings by less influential members and/or irrelevant postings will contribute less to the overall buzz score.

According to an embodiment, the raw buzz score may be computed so as to represent the cumulative buzz for a period of time T. The relative buzz score (sometimes referred to as the "standard buzz score") provides a relative (e.g., normalized) measure of the buzz score. In other words, the relative buzz score provides an indication of jumps, excursions, or anomalies in posting activity by influential members.

The raw buzz and relative buzz scores can be computed according to various timeframes. In a preferred embodiment, the raw buzz score and relative buzz score are computed on an hourly and daily basis.

In a preferred embodiment, the raw buzz score, B, is computed as follows:

$$B = \sum_{i=1}^{n} (Rel_i \cdot F_i)$$

where n is the number of messages in a window of time T, Rel is the relevance score for a message, and F is the influence score for the posting pseudonym.

Similarly, the relevant raw buzz, $B_r$, may be computed as follows according to an embodiment:

$$B_r = \sum_{i=1}^{n} (Rel_i \cdot F_{r_i})$$

where n is the number of messages in a window of time T, Rel is the relevance score for a message, and $F_r$ is the relevant influence score for a given local pseudonym.

In a preferred embodiment, the relative buzz score is computed as follows. First, the average raw buzz avg(B) is computed. For example, the average raw buzz avg(B) may be computed over a period of d days, such as by integrating or summing the raw buzz score over the period of time d and dividing the result by d. Next, the standard deviation std(B) is computed. For example, the square of the raw buzz score minus the average raw buzz $[B-avg(B)]^2$ divided by d may be integrated or summed over the period of time d. The square root of that result is std(B). Using the computed values for avg(B) and std(B), the relative buzz score, $B_s$, is computed as follows:

$$B_s = \frac{|B - avg(B)|}{std(B)}$$

where B is the present raw buzz score, avg(B) is the average raw buzz score over the period d, and std(B) is the standard deviation of the raw buzz score over the period d. As with other attributes, the relative buzz score can be computed as a relevant relative buzz score. In that case, the average buzz score and the standard deviation are computed based on the relevant raw buzz score, $B_r$.

Migration score—According to an embodiment, the aggregated attributes that message categorization subsystem 14 computes include a so-called "migration score." The migration score, M, can be thought of as an influence-weighted measurement of the net movement of pseudonyms into and out of a forum, community or other entity corresponding to the set of messages. In other words, the migration score provides an indication of the movement of activity based on changing levels of postings by influential pseudonyms. For example, the migration score may provide an indication of a net inflow or a net outflow. Preferably, the migration scoring includes an indication of direction. For example, if there is an outflow from a first forum, the migration scoring may provide an indication of where the outflow is going (i.e., to what other forum(s)). Preferably, the migration scoring includes an indication of the components of the net movement, such as the composition of the posting pseudonyms accounting for the net movement.

According to one embodiment, a streamlined migration scoring algorithm can ignore direction and composition, instead relying on the net change in buzz scores from one period (e.g., day) to the next. In this embodiment, the migration score, M, can be computed as follows:

$$M_n = B_n - B_{n-1}$$

where M is the migration score on day n, $B_n$ is the raw buzz score on day n, and $B_{n-1}$ is the raw buzz score from the previous day n−1.

Preferably, the raw buzz score for day n−1 is based on the close of the measurement window [e.g., 12:00 a.m. (end of the day for posting) or 4:00 p.m. (close of the NYSE market)]. Preferably, the run buzz score for n is updated periodically on day n, such as hourly. Generally, if the computed M is positive, it is reported as an "inflow." If the computed M is negative, it is reported as an "outflow." As with other attributes, the migration score can be computed as a relevant migration score based on the relevant raw buzz score, $B_r$.

Tracking of Buzz Scores and Migration Scores in an Exemplary Embodiment

Raw buzz scores, relative buzz scores, and migration scores can be aggregated over a set of messages that are derived or selected in various fashions. For example, the set of messages can correspond to a community, multiple communities, a forum, multiple forums, a topic, multiple topics, a thread, multiple threads, a pseudonym, or multiple pseudonyms (including a universal pseudonym).

According to one embodiment, electronic discussion system 10 (FIG. 1) tracks a series of topics for purposes of financial analysis. For example, electronic discussion system (EDS) 10 might track the following indices: NASDAQ 100, Dow Industrials 30, and the S&P 500. EDS 10 may also track the ten sectors of the Dow Jones Industry Classification System. EDS 10 might also track the individual stocks that comprise the aforementioned indices and sectors. This embodiment is hereafter referred to as the "financial embodiment." Of course, this series of topics is exemplary only, and EDS 10 could easily be configured to track other series of topics, such as all stocks listed with the SEC, all movies currently being shown at theatres, various television programs, and so forth.

EDS 10 may periodically (e.g., each hour) perform collection jobs from a series of discussion forums in order to collect messages that may be relevant to the series of topics. In the financial embodiment, EDS 10 may collect messages from the following online financial communities: Raging Bull, Motley Fool, Silicon Investor, and Yahoo. Other financial communities could easily be used for the collection jobs. These electronic discussion forums (i.e., entire communities or forums/groups/boards within a community) that are accessed by EDS 10 may be referred to as the "sources."

Preferably, central data store 20 (FIG. 1) includes a topics database 23 that associates each source with one or more topics. For example, topics database 23 may include a "board-topic link" (BTLINK) table that lists each of the boards (discussion groups) in the source communities from which messages are collected. The topics that are associated with each board are provided in the BTLINK table. Some boards may be associated with a single topic (e.g., the Amazon board on Yahoo is associated with the stock topic Amazon), while other boards may be associated with multiple topics (e.g., the rec.arts.movies.current-films board on Usenet is associated with all movie topics in the system). A BTLINK table can be used so that EDS 10 processes each message for the proper topic(s).

For each message collected, EDS 10 may compute a relevance score for one or several topics that are associated with the source. EDS 10 may also compute an impact score and/or relevant impact score for the message. If a relevant impact score is computed, one relevant impact score may be computed for each topic associated with the source.

In a preferred embodiment, only the highest relevance score for each message is used. For example, assume that message X is collected from Board Y. The BTLINK table indicates that Board Y is related to Stock Topic 1 and Stock Topic 6. The relevance score for message X is higher for Stock Topic 6 than for Stock Topic 1. The relevance score for Stock Topic 6 will be used, to indicate that message X is most relevant to Stock Topic 6, and the other relevance score is discarded. If a relevant impact score is needed, it is only computed for Stock Topic 6.

Based on the collected message information, EDS 10 can extract the pseudonym author of the message. Preferably, a so-called "author's table" is maintained in central data store 20 and may be used to track historic author scores, such as relevance, impact, influence, and the like. The author's table contains identifiers for the pseudonyms that have previously been tracked. Preferably, the author's table assigns a track number to each such pseudonym.

The extracted pseudonym author is compared to existing data or otherwise analyzed to determine if the author is a previously tracked author or a new author. Preferably, the extracted pseudonym is compared to the author's table to make this determination.

If the extracted author is a new author, EDS 10 may update the author's table to include the new posting pseudonym. Preferably, a new track number is assigned to the new author.

If the extracted author is not a new pseudonym, EDS 10 may compute an updated influence score and/or relevant influence score based on the new message posted by the extracted author. EDS 10 may also compute an updated reputation score and/or relevant reputation score based on the new message. Of course, updates to cumulative measures such as influence and reputation need not be performed on a message-by-message basis. Such updates could be performed on a less regular basis, such as by performing a periodic batch job involving many messages. Data for influence scores and reputation scores may be stored in the author's table or at a separate database.

Preferably, collection jobs collect messages from the sources on a periodic basis, such as hourly. Multiple messages are typically collected in each collection job, so that computation of relevance scores, impact scores, influence scores, and reputation scores can be performed in an efficient, batch-type fashion.

Periodically, such as on an hourly basis, EDS 10 computes buzz scores for the series of topics that are tracked. In the financial embodiment, buzz scores for individual stock topics can be computed directly from the relevance scores (from the messages) and the influence scores (for the posters of the messages) associated with that topic. Buzz scores for "level-up topics," such as sectors and indices, are computed by "rolling up" or aggregating the buzz scores for the topics making up the level-up topics. For example, a buzz score for the S&P 500 is computed by aggregating the buzz scores for the stock topics making up the S&P 500. The buzz score for the Dow Technology Sector is computed by aggregating the buzz scores for the stock topics making up the Technology Sector.

Preferably, EDS 10 computes both raw buzz scores and relative buzz scores. The relative buzz scores can be analyzed to identify unusual discussion patterns. According to one embodiment, the relative buzz scores can be compared to a so-called "anomaly threshold" in order to flag unusual buzz patterns. In the financial embodiment, the relative buzz score may be compared to a threshold (e.g., a threshold of about 2-5, preferably about 3) in order to identify companies that are "in play" or that are otherwise receiving an unusual relative level of attention by influential posters.

Periodically, EDS 10 also computes the migration scores for at least some of the topics that are being tracked. For example, in the financial embodiment, EDS 10 may compute the migration scores for each of the DOW sectors. Migration scores for the DOW sectors can be presented together in order to provide insight into the migration across sectors. Individual migration scores can be presented in order to provide insight into migration by sector over time. Providing migration scores based on sector is an exemplary embodiment. Migration scores could be provided for any or all of the series of topics tracked by EDS 10.

Figure 6:
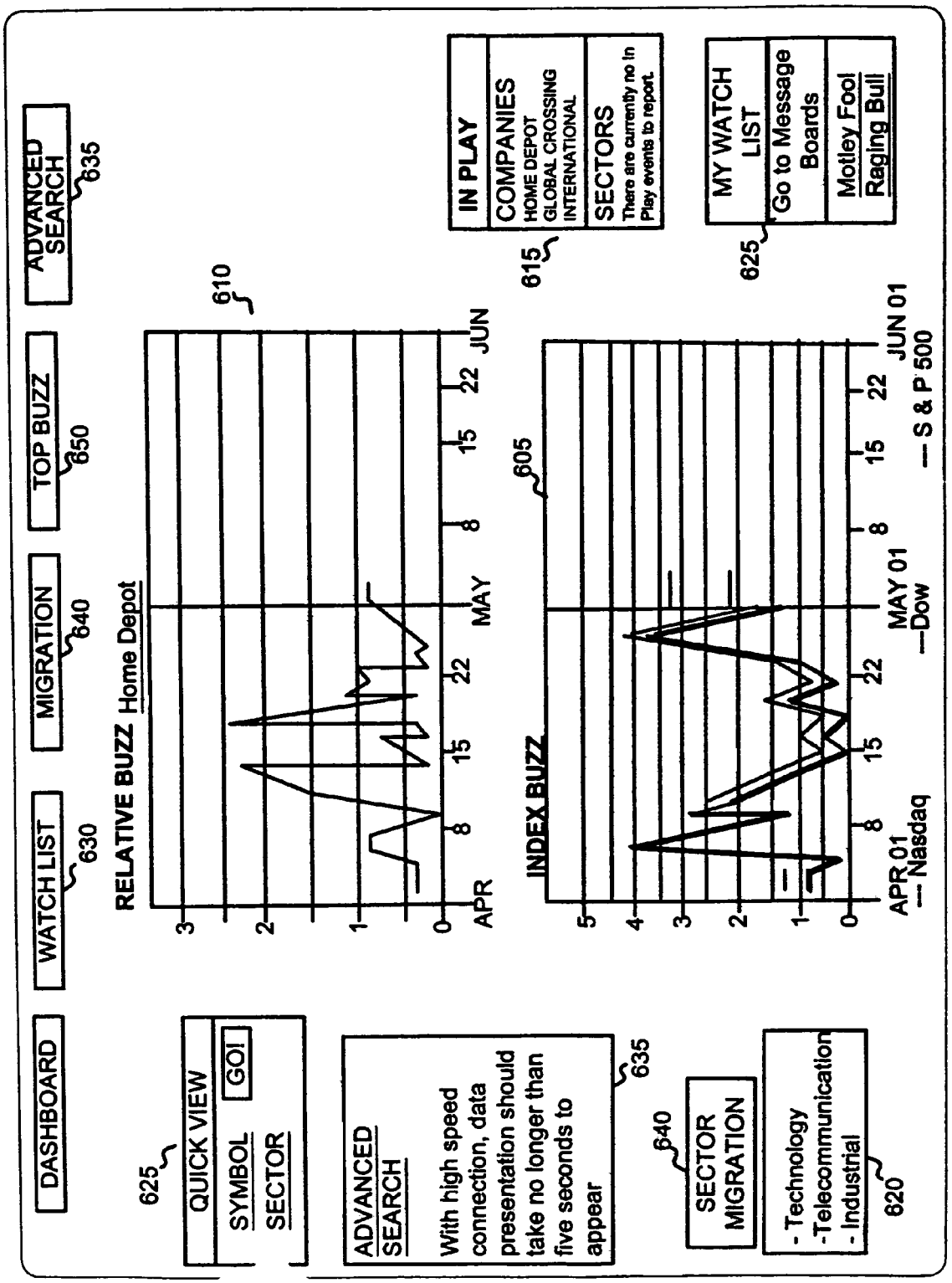
FIG. 6 is an exemplary graphical user interface (GUI) page according to an embodiment of the invention.

FIGS. 6-14 provide exemplary graphical user interface (GUI) display pages that could be provided according the financial embodiment. In FIG. 6, an introductory page ("Dashboard") provides an index buzz graph 605 and top-in-play graph 610. The in-play stocks are displayed in in-play area 615. Preferably, the in-play stocks may be selected as those stock topics having relative buzz scores exceeding an anomaly threshold of about 3. Sector migration list 620 displays the sectors with the top inflow migration scores. Link 625 provides links to the online communities that are the sources of EDS 10 (FIG. 1). Topic selection area 625 can be used to select other topics for display on the introductory page. Preferably, topic selection area 625 permits the user to select stock topics ("Symbol") or sector topics ("Sector").

Figure 7:
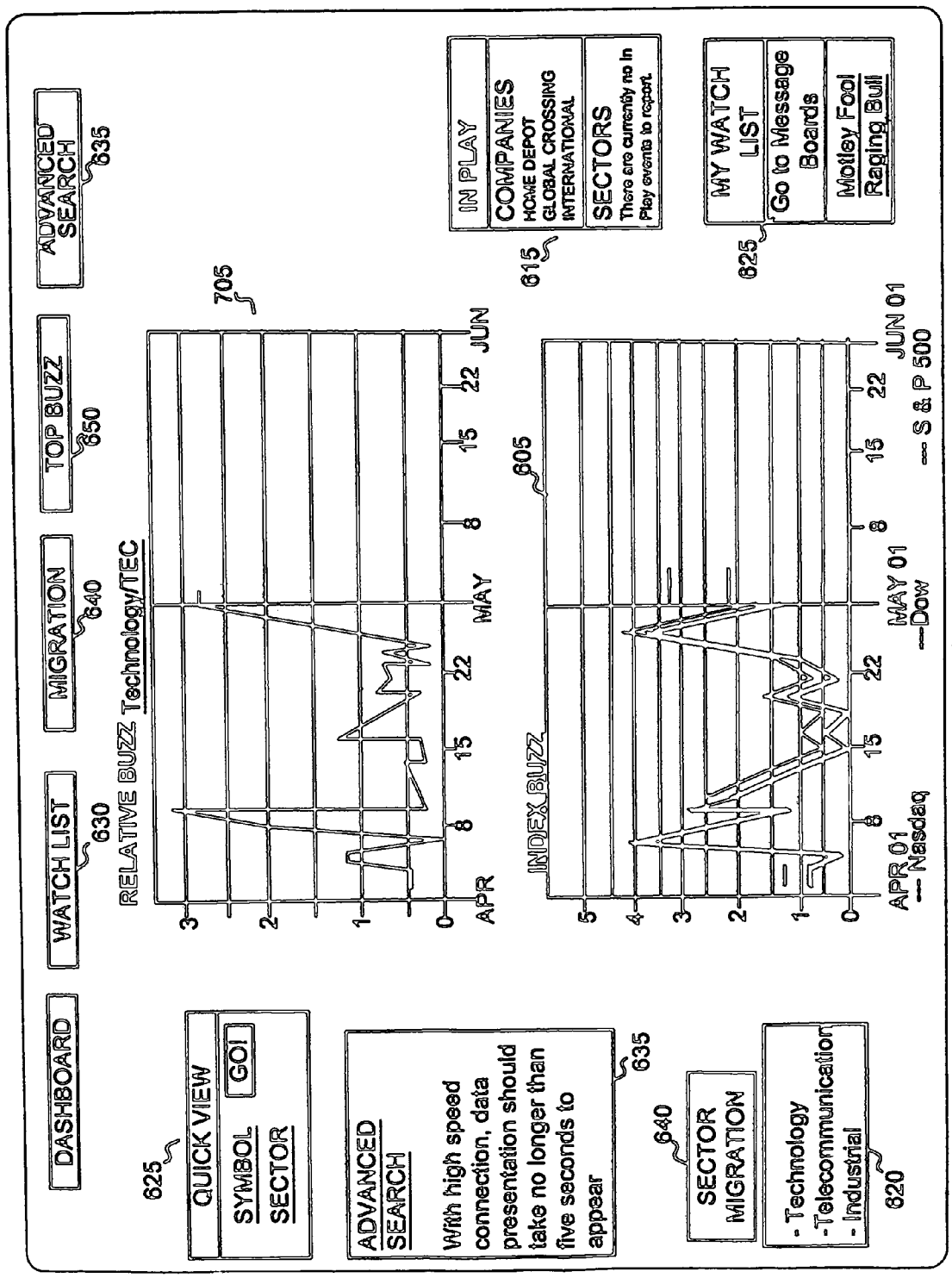
FIG. 7 is an exemplary graphical user interface (GUI) page according to an embodiment of the invention.

By selecting the sector topic "Technology" in topic selection area 625, the display page of FIG. 7 is presented. In FIG. 7, the upper graph now displays a relative buzz graph 705 for the Technology sector topic.

Figure 8:
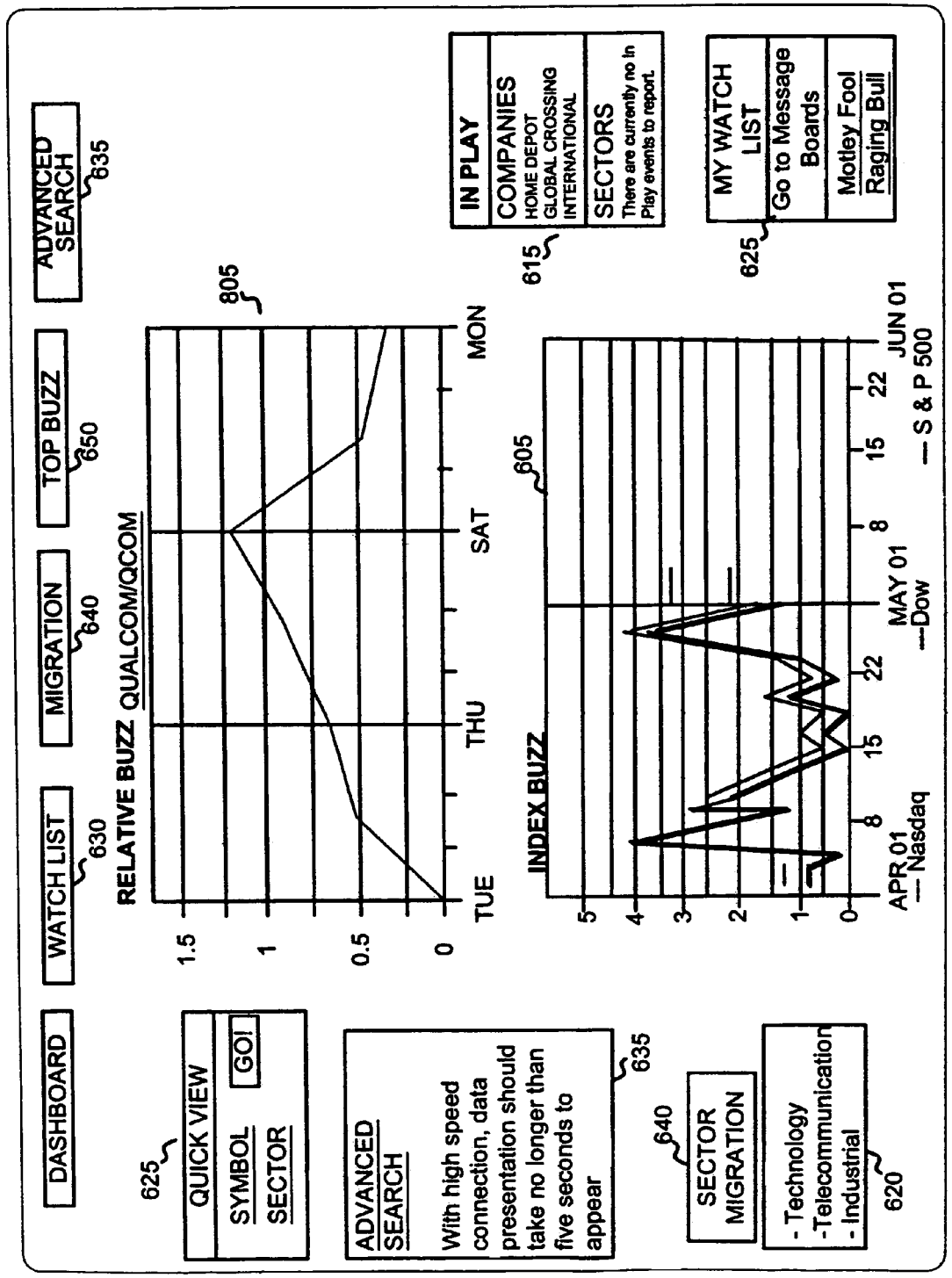
FIG. 8 is an exemplary graphical user interface (GUI) page according to an embodiment of the invention.

By selecting the stock topic "QCOM" in topic selection area 625, the display page of FIG. 8 is presented. In FIG. 8, the upper graph now displays a relative buzz graph for the QCOM stock topic.

Figure 9:
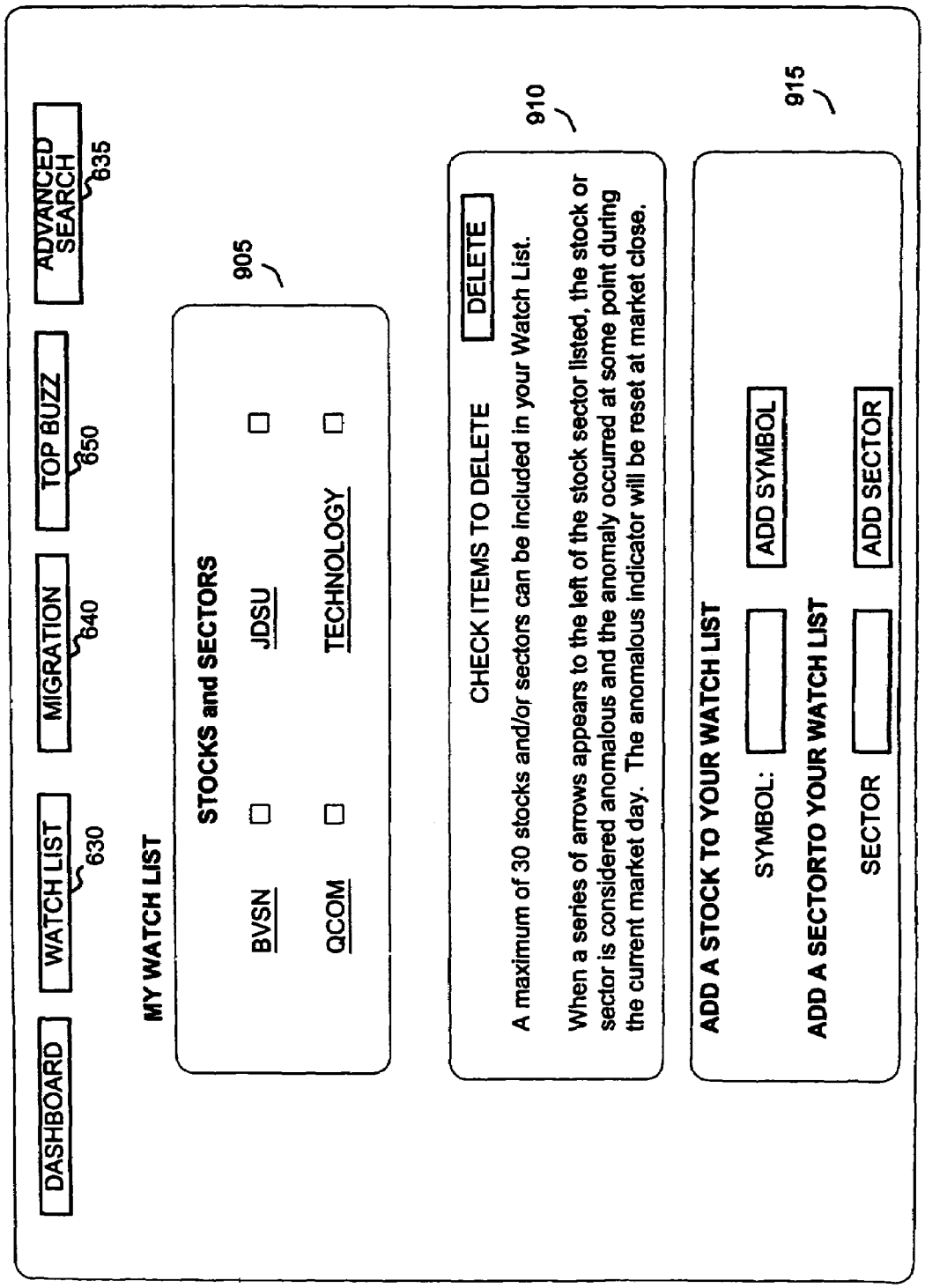
FIG. 9 is an exemplary graphical user interface (GUI) page according to an embodiment of the invention.

By selecting software button 630 ("Watch List") in FIG. 6, the display page of FIG. 9 is presented. The Watch List is a programmable function for a user to select specific topics that interest the user. In FIG. 9, watch list area 905 lists several stock topics and a sector topic that interest the user. The user can delete topics from the list using delete area 910 and the user can add topics using add area 915.

Figure 10:
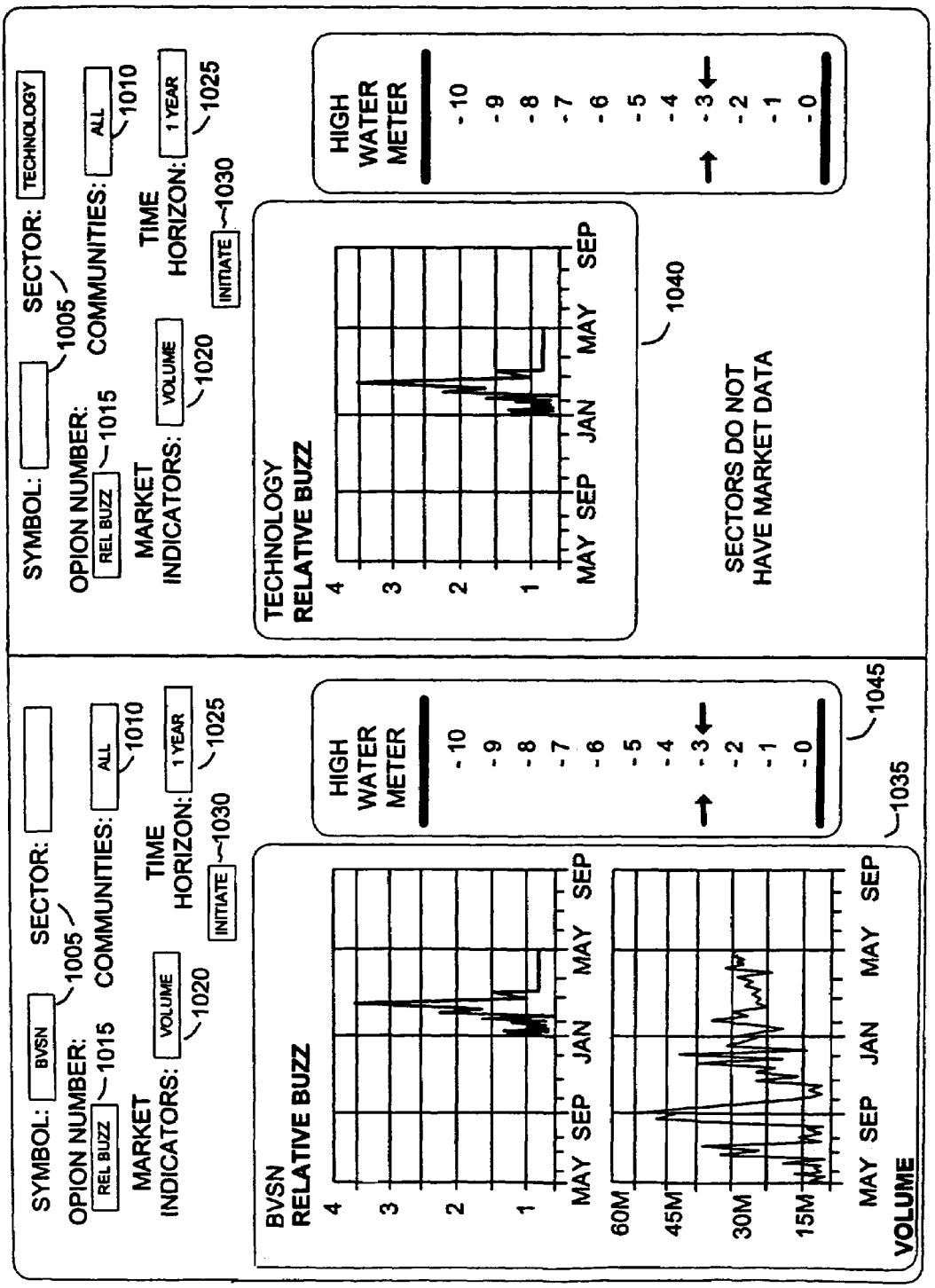
FIG. 10 is an exemplary graphical user interface (GUI) page according to an embodiment of the invention.

By selecting software button/link 635 (FIG. 6), the user can access a detailed display page such as that presented by FIG. 10. The exemplary display page of FIG. 10 is a two-pane display enabling comparisons between topics, such as between a first stock and a second stock, a first stock and a sector, and so forth. Topic input area 1005 allows input of a stock topic or sector topic. Source input area 1010 allows the user to select the online communities to be used (e.g., Yahoo, Raging Bull, All Communities, etc.) for the computation. Market events input area 1020 allows the user to select what external market indicators are to be viewed, such as volume, price, price range, average trade size, relative strength index, on-balance volume, and so forth. Time input area 1025 allows the user to select the timeframe, such as one year, six months, three months, one week, one day, and so forth. Computation input area 1015 allows the user to select the scoring that is to be viewed, such as raw buzz, relevant raw buzz, relative buzz, relevant relative buzz, and so forth. Initiate button 1030 initiates a computation.

In the exemplary display for FIG. 10, the comparison between the relative buzz and volume for the stock topic "BVSN" is displayed in first area 1035. Second area 1040 displays the relative buzz for the "Technology" sector topic as a whole. Meter display 1045 provides a meter-type display of the relative buzz. Preferably, meter display 1045 displays the current relative buzz, the maximum relative buzz for the day (referred to as the "high water" relative buzz), and the anomaly threshold (3).

Figure 11:
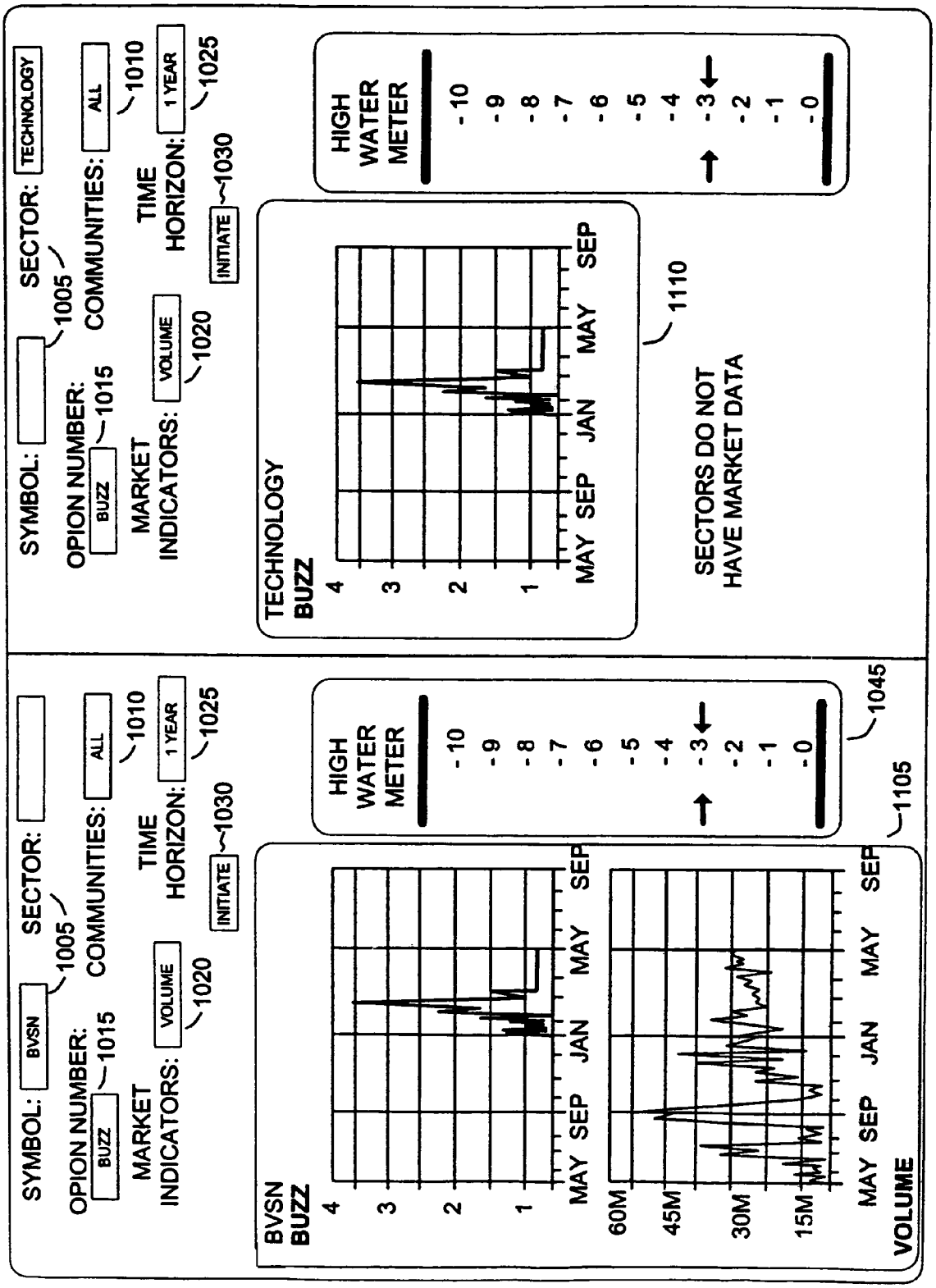
FIG. 11 is an exemplary graphical user interface (GUI) page according to an embodiment of the invention.

If the user changes "relative buzz" to "buzz" in computation input area 1015 (FIG. 10), the exemplary display page of FIG. 11 may be presented. In FIG. 11, first area 1105 and second area 1110 now display graphs of raw buzz for the stock topic and sector topic, respectively.

Figure 12:
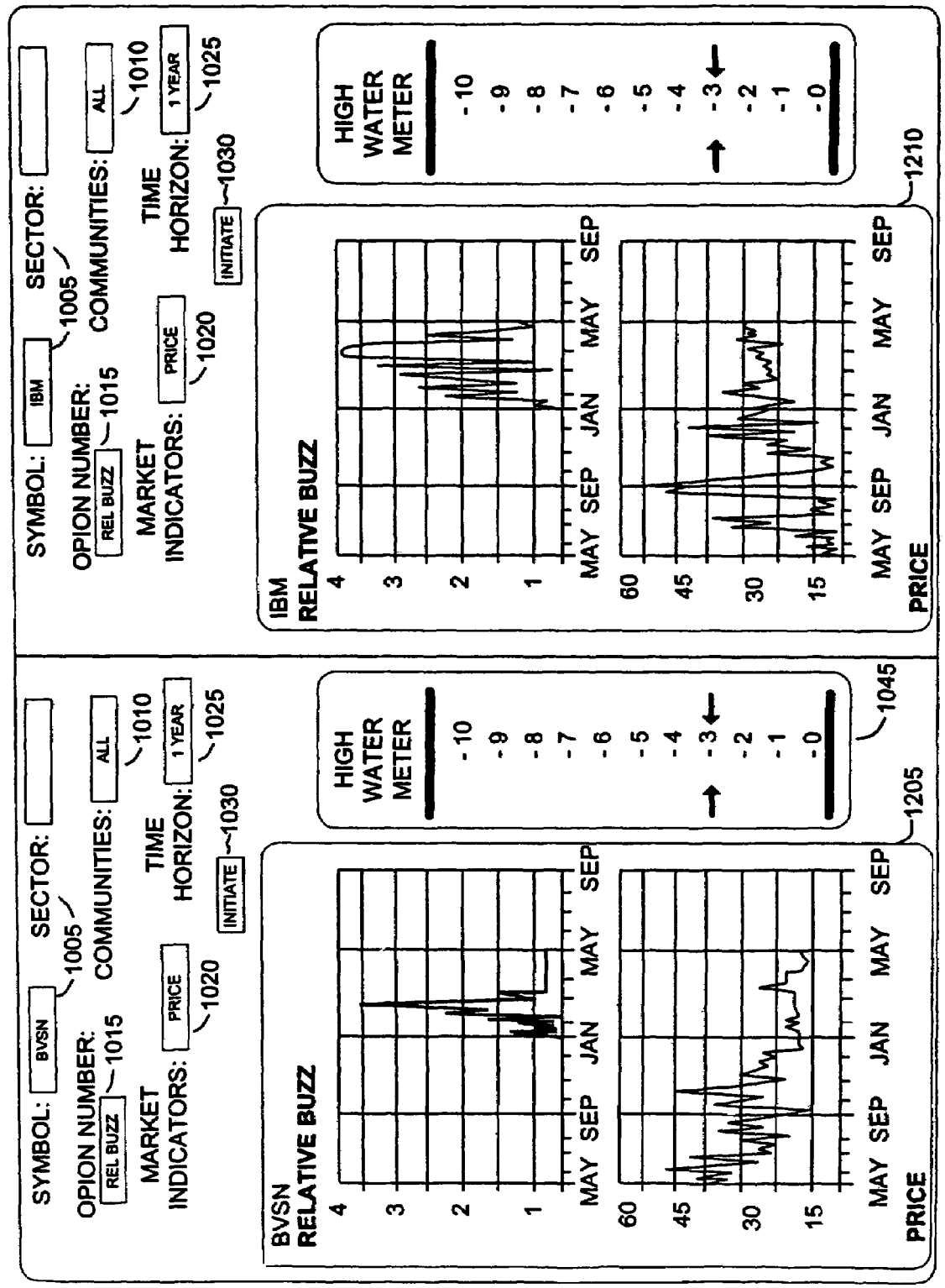
FIG. 12 is an exemplary graphical user interface (GUI) page according to an embodiment of the invention.

If the user changes "volume" to "price" in market events input area 1020 (FIG. 10), and the user also changes the "Technology" sector topic to the "IBM" stock topic in topic input area 1005 (right hand pane), the exemplary display page of FIG. 12 may be presented. First area 1205 now displays a graphical comparison between the relative buzz and the price of the BVSN stock topic. Second area 1210 now displays similar information for the IBM stock topic.

Figure 13:
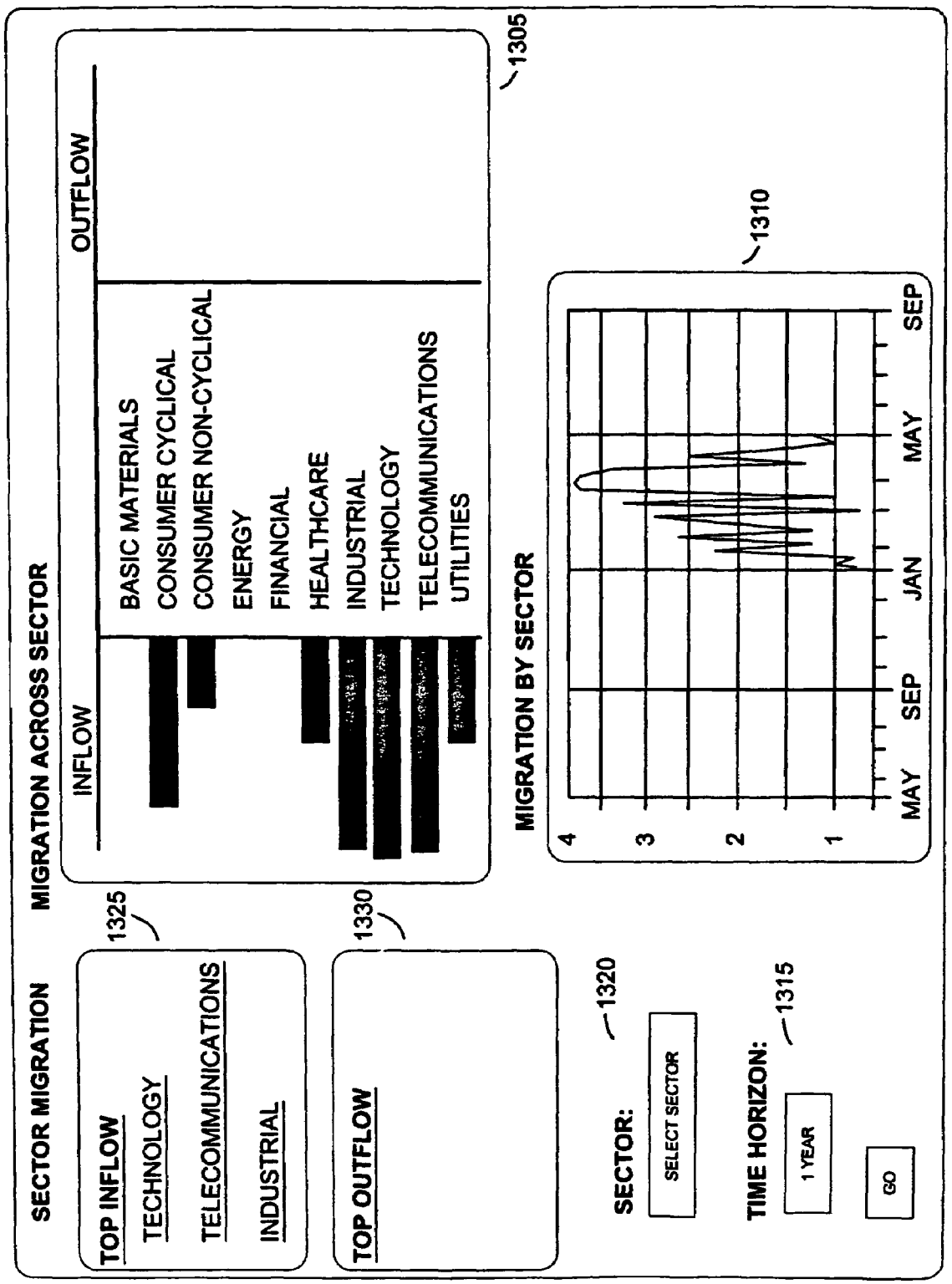
FIG. 13 is an exemplary graphical user interface (GUI) page according to an embodiment of the invention.

If the user selects software button/link 640 (FIG. 6), an exemplary migration scoring display page such as that of FIG. 13 may be presented. In FIG. 13, a first area 1305 presents migration across sectors. A second area 1310 presents a graph of migration by sector. The timeframe and sector can be selected using time input area 1315 and sector input area 1320, respectively. List 1325 and list 1330 may provide lists of top inflow sectors and top outflow sectors, respectively.

Figure 14:
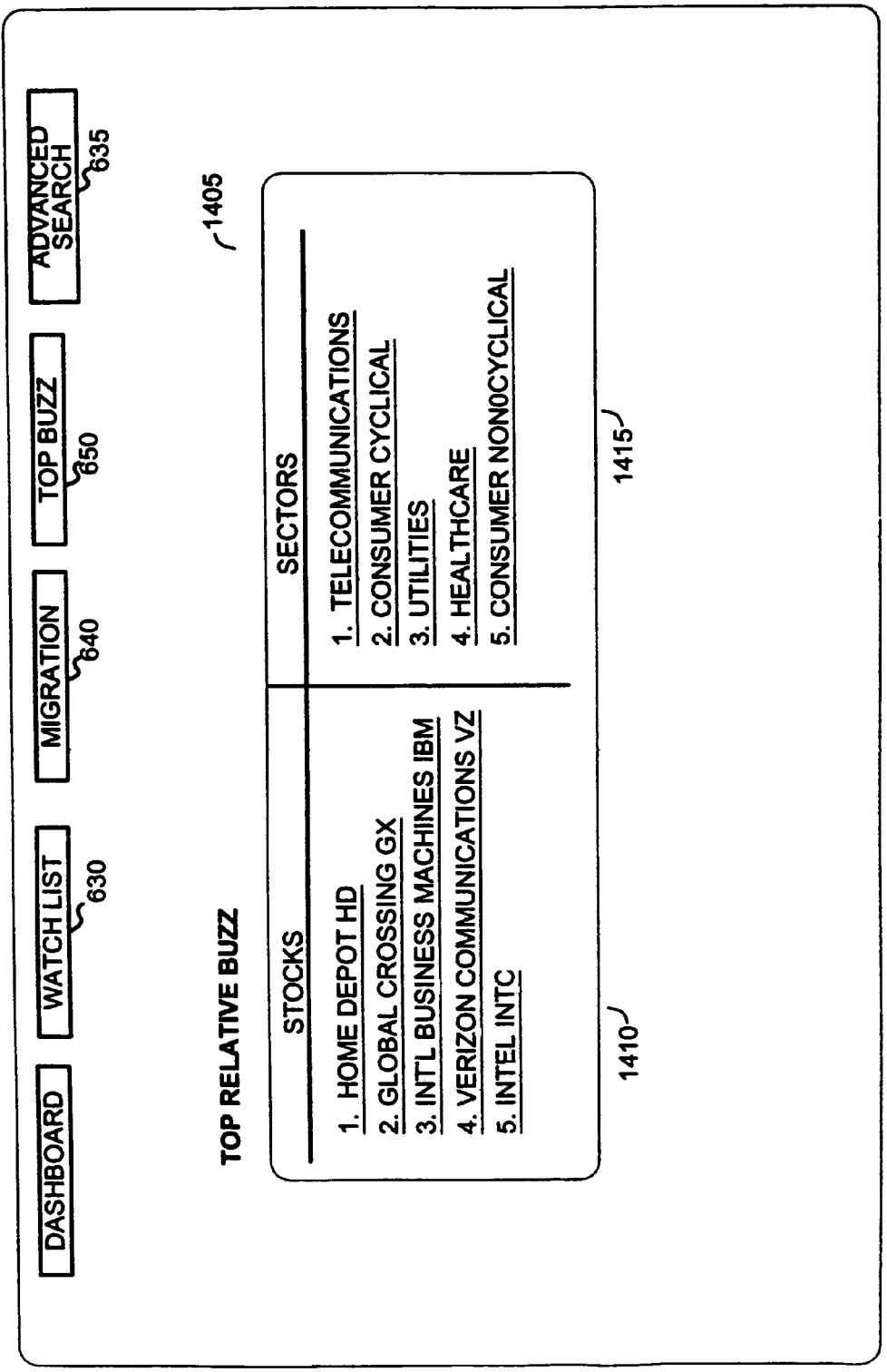
FIG. 14 is an exemplary graphical user interface (GUI) page according to an embodiment of the invention.

If the user selects software button 650 (FIG. 6), a top relative buzz display page such as that of FIG. 14 may be presented. FIG. 14 includes a list 1405 of topics having the top relative buzz scores. List 1405 may include a first list for stock topics 1410 and a second list for sector topics 1415.

Opinion Rating Subsystem

Opinion rating subsystem 16 extracts message information from database 22 in central data store 20 and assigns an opinion rating for each message by analyzing textual patterns in the message that may express an opinion. The textual patterns are based on linguistic analysis of the message information. For example, if the message body includes words such as "movie" and "awful" in the same sentence or phrase and the message had a high relevancy ranking for the topic "The Perfect Storm" the message may be expressing a negative opinion about the movie. Textual pattern analysis software, such as available from Verity Inc, of Mountain View, Calif., may be used to assign the opinion rating for each message. Such passive opinion polling is useful for market analysis without the need for individually interviewing active participants in a survey. Once the rating process is complete, the rating for each opinion processed is stored in database 22 in central data store 20. In a preferred embodiment of the present invention, opinion rating subsystem 16 computes sentiment scores for each message as described below.

Sentiment score—measures the degree to which a message exhibits positive or negative sentiment. The definition and measure of positive and negative sentiment may change from product to product, since the way people convey their opinions is very different depending on the subject being evaluated. For example, in the financial world, positive sentiment may be measured by detecting "buy" signals from the author. Negative sentiment may be measured by detecting "sell" signals. For entertainment, positive sentiment may be measured by detecting phrases that convey a general liking of the subject. Negative sentiment may be measured by detecting phrases that convey a general disliking of the subject.

As described above, sentiment is based on the message content, not just header information. In a preferred embodiment, positive sentiment and negative sentiment scores are individually computed for every message. Each result is bounded 0.0 to 1.0, where 0 indicates no sentiment was detected, and 1 indicates full positive and/or negative sentiment. A message may receive both positive and negative sentiment scores. Individual sentiment scores for a particular message are also referred to as "raw sentiment" scores. Raw sentiment scores may be either positive raw sentiment scores or negative raw sentiment scores. Aggregate sentiment scores can be computed based on aggregate raw sentiment scores for a community; for a particular subject in a community, or for a pseudonym.

The elements used to compute raw sentiment in a preferred embodiment include: message subject, message text; and positive and negative sentiment models. Similarly, the elements used to compute aggregate sentiment scores include sentiment scores of messages to be aggregated; and optionally includes date information for the messages and a total counting the number of messages in the aggregation.

In a preferred embodiment, a Verity engine will be used to score both positive and negative raw sentiment for each message according to the input sentiment model. The Verity output can be stored in a categorization table in a database such as Oracle, and may consist of a score from 0.0 to 1.0 for every message/sentiment combination in the query set. Aggregation may be achieved by computing the average score of a specified message set, for a given date or number of messages. The message set is defined as the set of messages that belong to the specified subject, community, and/or pseudonym.

The aggregation, or "average score" above, can take many forms. Positive and negative sentiment may be treated as independent to compute an aggregate "positive sentiment" and an aggregate "negative sentiment" score. Or, an aggregate "net sentiment" score can be computed by combining positive and negative raw sentiment scores. The equations below may be used to computer aggregate sentiment scores for a set of messages:

$$S_p = \sum_{i=1}^{m} s_{pm}$$

$$S_n = \sum_{i=1}^{m} s_{nm}$$

$$S = \sum_{i=1}^{m} (s_{pm} - s_{nm})$$

where $S_p$ is the aggregate positive sentiment, $S_n$ is the aggregate negative sentiment, S is the aggregate net sentiment, m is the set of messages, $S_{pm}$ is the positive sentiment score for a particular message, and $S_{nm}$ is the negative sentiment score for that message.

Aggregation for a subject or community can be performed for all messages posted within a given date. Further, intraday aggregation may be achieved by setting the target date to the current system date, and will include only those messages that have already been collected and categorized for the day.

In a preferred embodiment, sentiment (which relates to opinions expressed in a message) and relevance scores (which relates to subject matter addressed in the message) are measured completely independent of one another. The two scores (sentiment and relevance) may be further correlated for the purpose of detecting sentiment about a specific topic. In one embodiment of the present invention, such correlation is computed by using the highest relevance score (what is the message most about) and the highest sentiment score (is the message mostly positive or negative). In this manner a sentiment score may be determined for a particular topic. Additionally, topical aggregate sentiment scores may be computed by aggregates sentiment scores for messages directed to a common topic.

Data Analysis System

Data analysis system 30 comprises objective data collection subsystem 32, analysis subsystem 34 and report generation subsystem 36, as shown in FIG. 1. The overall goal of data analysis system 30 is to identify and predict trends in actual markets based on the electronic discussion data being posted to various electronic discussion forums and to provide reports for end-users 9 of the system and method of the present invention.

Objective Data Collection Subsystem

Objective data collection subsystem 32 collects objective data from both traditional and electronic sources and stores the information in database 24 on central data store 20 for later analysis. Objective data sources 8, shown in FIG. 1, may include for example, market data such box office sales for recently released movies, stock market activity for a given period, television viewer market share (such as Nielsen ratings), and other such objective data. The specific data collected from each objective data source depends on the nature of the market being analyzed. For example, objective data on the stock market may include: a company's name; its Web home page address, i.e., universal resource locator; ticker symbol; trading date; opening price; high price; low price; closing price and volume. In other markets, the objective data may include: sales, measured in units sold and/or revenue generated; attendance at events; downloads of related software and media files; press release date, time and key words; news event date; and the like. The objective data is used by analysis subsystem 34 to identify and predict trends and correlation between real world events and electronic discussion data, as described below.

Analysis Subsystem

Analysis subsystem 34 performs analysis of the information collected by the message collection subsystem 12 and objective data collection subsystem 32, and the categorization and opinion information determined by message categorization subsystem 14 and opinion rating subsystem 16, respectively. Analysis subsystem 34 determines the existence of any correlation between discussion forum postings and market activity for each topic that the system is currently tracking. The results of the analysis are stored in the analysis database 26 in central data store 20 for eventual presentation to end-users 9. Analysis subsystem 34 examines the internal behavior of communities and correlates individual and group behavior to the world external to the communities using a variety of analysis techniques with a variety of goals. Analysis subsystem 34 identifies and categorizes actors by measuring the community's response to their postings; measures and categorizes the community's mood; correlates actors' behavior and the communities' moods with objective data sources; and forecasts the markets' behavior, with confidence estimates in various timeframes. Identifying and tracking both the actors and the community mood is important, because the effect of an actor's message depends in part on the mood of the community. For example, an already-nervous community may turn very negative if a buy signaler or other negative actor posts a message, while the same message from the same person may have little effect on a community in a positive mood. The following sections describe the patterns sought in the analysis and describes how the community behaves after postings by each local pseudonym associated with the patterns.

a) Actor Classification

Actors are classified by correlating their postings with objective data, which is external to the electronic forum. Changes in the objective data (e.g., stock price changes, increased book sales, etc.) are tracked during several discrete short time periods throughout a longer time period, such as a day. A score is assigned to each local pseudonym posting messages related to a given topic based on the change observed in the objective data from the preceding discrete time period. A local pseudonym's score may be high, medium or low, depending on the magnitude of the change. For example, in a preferred embodiment, local pseudonyms who tended to post messages just prior to major increases in stock price, receive a high positive scores; while those whose postings tended to precede major drops have the lowest negative scores. The scores assigned to a local pseudonym during the longer time period are aggregated into a composite score for the local pseudonym.

As discussed in the definitions sections above, actors can be classified as an initiator if the actor tends to post the first message leading to subsequent responses forming a dialog on a particular subject. Similarly, an actor tending to post the final message closing the dialog on a particular subject is classified as a moderator.

Two of the more interesting classifications made by analysis subsystem 34 identify buzz accelerators and buzz decelerators. Because of the correlation identified in some markets between the level of discussion in a community and the objective, real-world events, identification of buzz accelerators and decelerators can be used to predict the probable outcome of real-world events. For example, if a local pseudonym were identified as a buzz accelerator for electronic discussion forums related to the stock market, whenever that local pseudonym posts a message to such a forum, one would expect a rise in the discussion level, and the correlating drop in stock prices. Related, but not synonymous, classes of actors are buy signalers and sell signalers. Such actors tend to post messages at a time preceding a rising or falling market for that topic. In contrast to buzz accelerators or decelerators, buy and sell signalers do not necessarily tend to reflect or precede rising levels of electronic discussion on the forums.

The final three classes of local pseudonyms are manipulators, provokers and connectors. As noted in the definition sections, a manipulator is a local pseudonym with little posting history except as manipulators, whose combined postings on one topic elevate the buzz level in the absence of external confirming events. Such actors may be attempting to obscure analysis or to sway the markets being analyzed. As such, identifying and tracking manipulators is important for ensuring validity of the results output by analysis subsystem 34. Provokers are local pseudonyms that tend to start longer discussion threads, which may contribute to a community's overall discussion level, but is not indicative of a rise in discussion level for the community. Again, identification and tracking of provokers allows better results in the analysis of electronic discussion information. Finally, a connector is a local pseudonym that posts on a high number of topics or a high number of communities.

Figure 4:
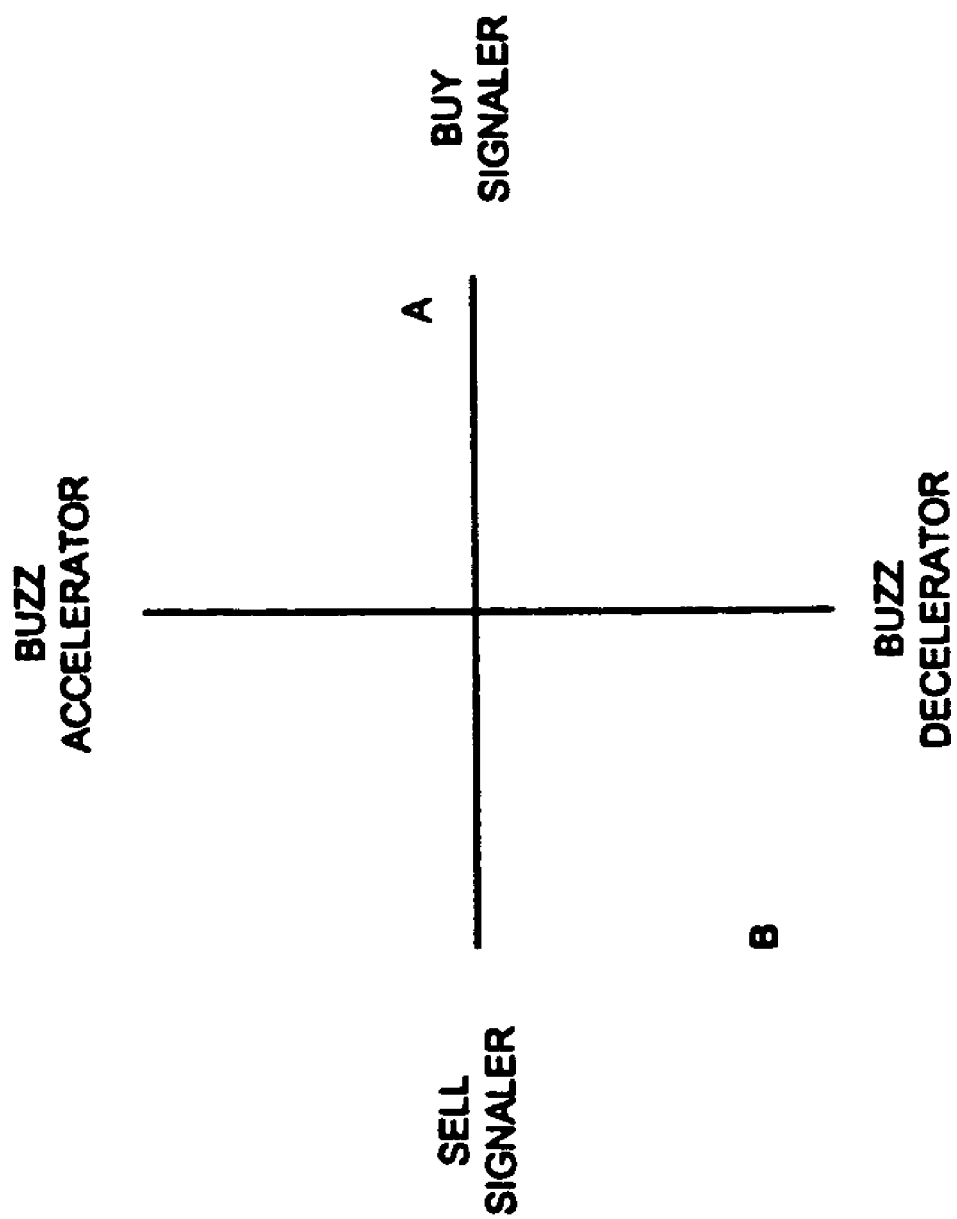
FIG. 4 is an example of graphical report output by a report generation subsystem of the present invention.

Analysis subsystem 34 tracks and observes the behavior characteristic of the local pseudonyms posting messages to electronic discussion forums and assigns a reputation score indicating their categorization. In a preferred embodiment, the reputation score comprises an array of ratings for each of the possible categorizations. From the reputation score, composite views of the tendencies of the local pseudonyms can be formed to graphically illustrate the local pseudonym's reputation in a given community. An example of one such composite view is shown in FIG. 4, wherein a local pseudonym's reputation as a buzz accelerator/decelerator is plotted against its reputation as a buy/seller signaler. As shown in FIG. 4, local pseudonym A has a strong tendency as a buy signaler and is a buzz accelerator, but not a strong buzz accelerator. In contrast, local pseudonym B has strong tendencies as both a sell signaler and a buzz decelerator in the market. The impact of the classifications depends, of course on the market involved, as discussed previously.

b) Community Mood

As discussed above, a local pseudonym's classifications are useful to the extent they can quantify the tendencies of the various actors in a community. However, the impact of such actors on the community depends not only on the tendencies of the actors, but also on the overall mood of the community. The measure of a community's mood is determined from the change in discussion levels in the community. The mood assigned is based on observed trends for the associated topic.

For example, when discussion levels rise in stock market forums, the rise is usually accompanied by a drop in stock market prices due to increased selling activity, indicating a negative mood in the community. Similarly, an increase in discussion levels for a movie topic may indicate a generally positive mood for the community. Other indicators of community mood include the number of new participants in a community, which correlates to an increased interest in the community's topic. Moreover, the combined positive and negative influence scores of actors in a community is an indicator of its overall sentiment. Another factor indicating a community's mood is its turnover rate, i.e., the number of new participants versus the number of old participants, indicates the depth of interest in the community's topic.

The combined provocation-moderation scores of active participants is expected to be a forecaster of the community's discussion near-term discussion level.

The ratio of message volume to external volume (stock trading volume in the prototype) will be explored as an indicator of confidence for other forecasts.

The number of active discussion threads, relative to the number of participants, is an indicator whose significance we plan to explore. "Flame wars," for example, are typically carried out by a small number of people generating a large volume of messages.

The ratio of "on-topic" to "off-topic" messages, which we expect to be able to measure via linguistic analysis, is an indicator whose significance we plan to explore.

Co-occurrence of topics within a community, also measurable via linguistic analysis, is an indicator of shared interests among communities, whose significance we plan to explore.

c) Algorithms and Modeling

As discussed above, the analysis system uses patterns in message postings to identify community moods and opinion leaders, i.e., those local pseudonyms whose postings can be correlated to changes in the market and/or forum discussion levels. Linguistic analysis extends this analysis by showing and summarizing the subjects under discussion and reveals attitudes toward the topics discussed. The linguistic analysis used in the present invention is not intended to explicitly identify any individual's attitude toward a given topic; rather the overall attitude of the community is assessed.

The analysis system relies on the inherent repeated patterns in discussions that yield accurate short-term forecasts. The existence of such repeated patterns is known in the art, and can be explained with reference to three areas of research into social networks. Chaos and complexity theories have demonstrated that large numbers of agents, each of whom interacts with a few others, give rise to repeating patterns by virtue of simple mathematics. Social network theory grounds mathematical models in human behavior. Computer-mediated communications research applies the mathematical models to "new media" technologies including the Internet.

As with any high-frequency, high-volume data mining challenge, the number of potential variables is enormous and the applicable techniques are many. To simplify this problem, the system and method of the present invention reduces the data sets as much as possible before analysis. Accordingly, on the assumption that there are a very small number of opinion leaders relative to participants, the vast majority of participants whose postings did not occur near objective data inflection points, i.e., sharp changes in the objective data, are eliminated. This greatly reduces the amount of data that is further analyzed by the system and method of the present invention. The period of time over which inflection points are identified has a great impact on which patterns can be identified and usefulness of the resulting data. For example, stock price movement and other markets are known to have fractal patterns, so they have different inflection points depending on the time frame chosen. Accordingly, different inflection points will be identified if the period is weekly, monthly, or yearly. The more volatile a market is, the more inflection points can be found.

The following sections describe the various types of analyses used in a preferred embodiment of analysis subsystem 34.

Statistical Analysis

Histograms divide scores into "bins" that show the distribution across the range of values. Histograms of the positive/negative influence scores, as well as the provoker/moderator scores described above, are used to select statistically significant local pseudonyms at the outlying ends of the normal distribution curve. A database query can then calculate the ratio of these opinion leaders who have posted in the last X days. For example, if 25 of the top 50 "positives" and 10 of the top 50 "negatives" posted in the last two days, the ratio would be 2.5, indicating that positive market movement is more likely than negative.

1) Fourier Analysis

Fourier analysis is a well-established technique, with many variations, for breaking down a complex waveform, such as plots of discussion levels, into component waves. This makes it possible to subtract regularly occurring waves, such as increased or decreased discussion levels on weekends, in order to isolate the movements that signal meaningful events.

2) On Balance Volume

On Balance Volume (OBV) uses stock trading volume and price to quantify the level of buying and selling in a security. In a preferred embodiment of the present invention, OBV is used, e.g., by substituting the number of discussion participants for the stock volume. In this context, OBV is a negative indicator, i.e., when it is rising, price tends to fall; when it falls, price tends to rise.

3) Moving Average Convergence-Divergence

Moving Average Convergence-Divergence (MACD) is a technical analysis that may be applied to the discussion levels in the communities. MACD generates signals by comparing short-term and long-term moving averages; the points at which they cross one another can be buy or sell signals, depending on their directions. MACD can signal when a community's discussion level rises above the recent averages, which is often an indicator of rising nervousness.

Link Analysis

In one embodiment of the present invention an "80/20 rule," supported by social network research, is used wherein only the 20 percent of participants whose posts are "closest" (in time) to significant objective data inflection points are analyzed. While this method simplifies the task of analyzing the data, there is some risk that opinion-leading groups may be overlooked. Such groups comprise individuals that do not consistently post at the same time, but as a group exhibit the characteristics of individual opinion leaders. For example, it is possible Bob, Sam and George form a positive opinion leader group, i.e., when any one of them posts a message, prices tend to rise. Data mining link analysis tools are used to explore for these kinds of relationship and to identify groups of local pseudonyms whose behavior as a group exhibits predictive patterns.

Geographic Visualization

Tools for geographic visualization display the distribution of information on a map. Although geographic location is unknown for many of the local pseudonyms being monitoring, it is available for some of them and will be tracked as the information becomes available. This analysis allows monitoring of the awareness of a topic, such as a newly released consumer media device, as it spreads throughout the United States and other countries. This analysis will help marketers decide where promotional and advertising budgets can be spent most effectively. Marketing experience and the mathematics of social networks predict that awareness follows a stair-step pattern. The analysis results of the present invention can be used to identify these plateaus very early, allowing marketers to cut spending earlier than they otherwise would.

4) Clustering

Cluster analysis allows discovery of groups of local pseudonyms that "travel in the same circles." For example, there may be a group of 20 local pseudonyms that tend to participate in discussions on five topics. This cluster of shared interests is a means of automatically discovering that there is some kind of relationship among the five topics. In the financial market, it implies that people who are interested in any one of the five companies are likely to find the other four interesting. Presenting these as recommendations is a form of collaborative filtering, because it helps the user select a few new topics of interest out of thousands of possibilities. The most significant aspect of this analysis is that the computer system needs no knowledge of why the topics are related; the system can therefore discover new relationships.

5) Regression

Regression analysis is a well-known method of correlating sets of data. Regression is the most fundamental means for identifying if the patterns in communities have a positive, negative or insignificant correlation to external events.

6) Neural Networks and Genetic Algorithms

Neural networks and genetic algorithms are machine-learning approaches for finding optimal solutions to complex problems. Neural nets take a set of inputs, which might be various parameters about a community, such as message level, ratio of positive to negative opinion leaders, etc., and discover relative weightings to achieve a desired outcome, such as a predicted stock price. Neural nets have been used successfully in other types of financial forecasting and analysis. Genetic algorithms evolve solutions to complex problems by imitating the competitive nature of biological genetics. Factors under consideration must be encoded in a binary form and a system for ranking the value of the outcome is created. Software applications used to perform such analyses in the present invention are commercially available from, e.g., Ward Systems Group, Inc. of Frederick, Md.

Report Generation Subsystem

Report presentation subsystem 36 extracts the results of the analysis performed by analysis subsystem 34 for presentation to end-users 9. In a preferred embodiment, report generation subsystem 36 and presents it to end-users via a Web-based user interface. In this embodiment, the reports are published using a variety of formats, such as, e.g., PDF, HTML, and commercially available spreadsheets or word processors, and the like. End-users 9 may use any suitable Web browser to view and receive the reports generated by report generation subsystem 36. Examples of such Web browsers are available from Netscape, Microsoft, and America Online. In an alternative embodiment, report generation subsystem 36 presents the results in written reports that may be printed and distributed.

Report generation subsystem 36 produces and displays some reports automatically and other reports may be specifically requested by end-users 9. For example, in a preferred embodiment, dynamic content boxes are automatically generated and displayed via a Web server. Such dynamic content boxes may include a report on the current market mood, displaying a visual indicator for the NASDAQ 100, for example. Such a market mood graph may contain the NASDAQ 100 market mood over the last 1 year together with the closing price of the NASDAQ 100 for the same period. Another dynamic content box could, e.g., display the top five companies where activity is spiking the greatest over the last 1 day versus activity recorded over the last 10 days. Alternatively, the dynamic content box could display the top five companies that are being discussed by the top five buy signalers. Other such reports can be generated and displayed automatically such that when end-users 9 connect to the Web server, the reports are presented without the need for requesting the information.

Other reports that may generated by report generation subsystem 36 include for example, a list of the most recent subjects posted by the top buy signaler for each of the top five most positive market mood companies and real-time trends such as information about postings to Internet based communities. These reports and other may be dynamically built by report generation subsystem 36 based on requests for information from end-users 9. For example, end-user 9 may specify a community, a local or universal pseudonym or a topic about which detailed information can be presented. For example, if an end-user requests a report concerning pseudonyms (local or universal) meeting a certain criteria, report generation subsystem 36 executes a search of all matching pseudonyms together with the source of the pseudonym (Yahoo, Raging Bull, etc.), if local, and links to a profile page for each pseudonym.

A local pseudonym's profile page comprises another report generated by subsystem 36 and includes, e.g., the local pseudonym and its source; an e-mail address of the local pseudonym on the community, if one exists; the total number of posts that the local pseudonym has made in discussion groups that are being tracked; the number of different topics that the local pseudonym has posted to in discussion groups that are being tracked; the most recent posting date that the local pseudonym has made to any discussion group and a link to that posting; a list of most recent postings to discussion groups categorized by topics; the local pseudonym's reputation score for each category; a graphical representation of the local pseudonym's reputation (e.g., FIG. 4); and the like.

In addition to retrieving reports concerning particular local pseudonyms, report generation subsystem 36 allows end-users 9 to locate detailed information about each topic (company, book, movie, etc.). For example, if an end-user requests a report on a particular company, by e.g., the stock symbol or the company name, another search is executed. Report generation subsystem 36 displays information such as a list of all matching companies; the name of the company; the stock symbol of the company; and a link to a company profile page where users can obtain detailed information about that particular company.

A company profile is similar to a pseudonym's profile page. That is, the company profile page is another report generated and displayed by report generation subsystem 36. In a preferred embodiment, the company profile page comprises detailed information about a particular company, especially information that relates to postings in stock message forums for that company. Other information that may be displayed includes, e.g., the name of the company; the stock exchange that the company is a member of; the domain name for the company's home page and a link; a link to the company's stock board on Yahoo, Raging Bull, Motley Fool or other prominent electronic discussion forums; a list of the most frequent posters on the company's stock discussion groups; the top buzz accelerators and the top buzz decelerators for the company's stock discussion groups; and top buy and sell signalers for the company's stock discussion groups.

For other topics, analogous profile pages can be presented. For example, a movie's profile page may comprise the movie's name, the producer, and other objective information as well as identification of the top buzz accelerators and decelerators, and other results of output by analysis subsystem 34.

Universal Pseudonym Registration System

Figure 5:
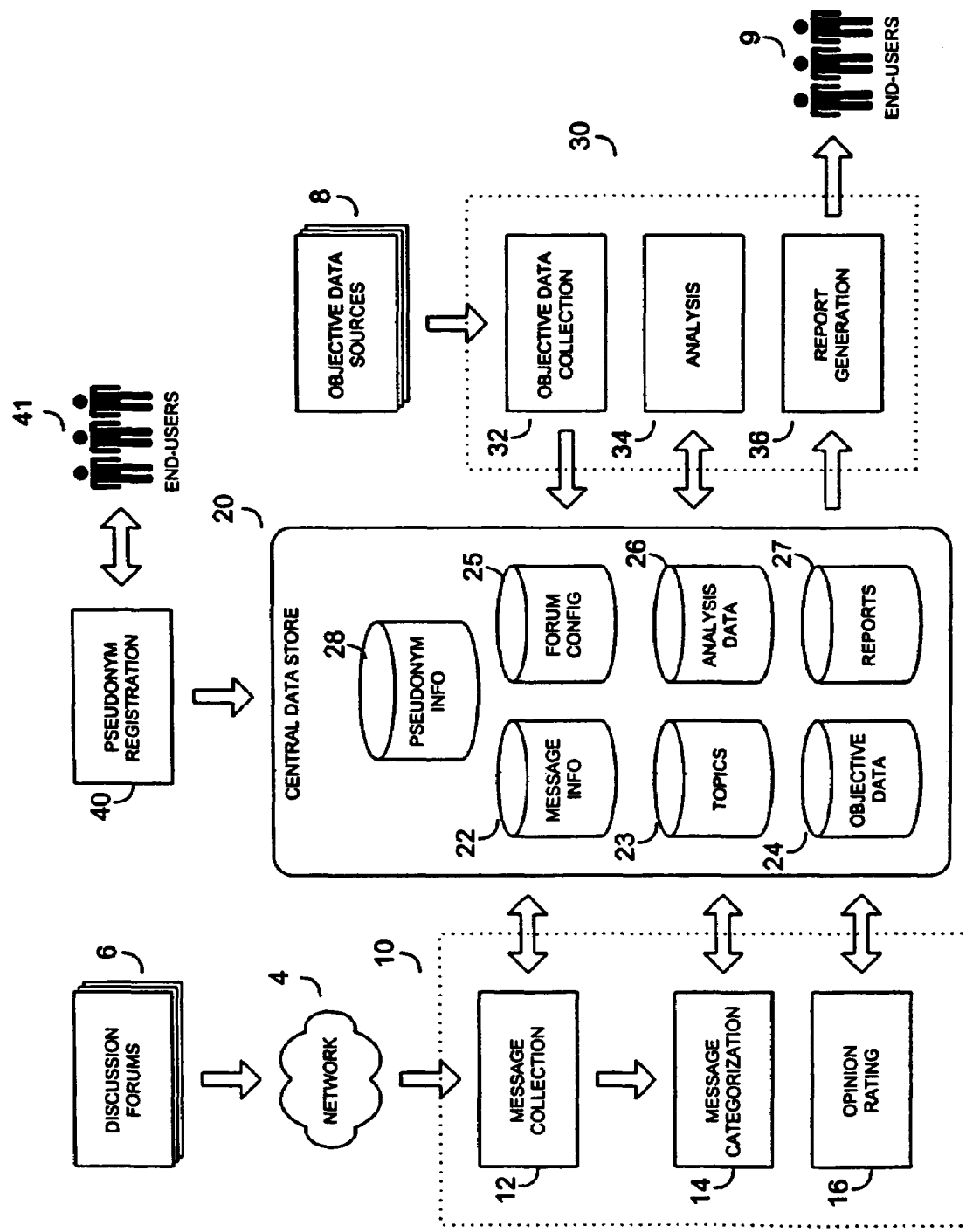
FIG. 5 is a schematic diagram of an embodiment of the present invention comprising a pseudonym registration and tracking service.

As shown in FIG. 5, the present invention may include universal pseudonym registration system 40. Universal pseudonym registration system 40 allows end-users, such as end-users 41 to sign-up (or register) for universal pseudonym services. The services include creation of universal pseudonyms for use in posting messages to electronic discussion forums; the capability to build a reputation in a community through persistent universal pseudonym identity, opt-in marketing services (wherein universal pseudonyms can be registered to receive selected categories of marketing information). For example, an end-user can register one universal pseudonym and specify an interest in comic books, and register another universal pseudonym with an interest in stock market forecasts. Although the two universal pseudonyms belong to the same person, the person can more easily differentiate and select the type of information sought at a particular moment. Moreover, registration with universal pseudonym registration system 40 provides a means for end-users 41 to provide certain demographic information (age, gender, salary, and the like) without revealing their actual identity.

In a preferred embodiment, universal pseudonym registration system 40 provides a digital signature that registered universal pseudonyms may use to prove their identity as a registered universal pseudonym. The digital signature allows the user to indicate within a message posting that the local pseudonym is linked to other pseudonyms via a universal pseudonym that can be verified by universal pseudonym registration system 40. In this manner, not only can the system and method of the present invention track the user's posting on various communities to rate the user's reputation across multiple communities, it also informs other community participants that the user has registered the local pseudonym on universal pseudonym registration system 40. As discussed above, a user may be known by the local pseudonym john@yahoo.com in the Yahoo.com community, and by the local pseudonym john2@amazon.com in the Amazon.com community. In this case, the end-user can register both local pseudonyms with universal pseudonym registration system 40 and associate the two local pseudonyms with a single universal pseudonym, e.g., john.doe@pseud.org. When positing messages under either local pseudonym, the end-user authenticates his or her identity by providing the digital signature in the message. When other participants in the community see the digital signature, they can verify that the end-user john@yahoo.com is the same end-user john2@amazon.com by checking universal pseudonym registration system 40.

Universal pseudonym registration system 40 is a useful addition to the overall operation of the system and method of the present invention. By allowing end-users to select a universal pseudonym and associate various local pseudonyms, the data collected and analyzed can have more points for correlation. End-users are benefited both by better analysis results and by more control over their personal identifying information.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for processing message traffic from a plurality of electronic discussion forums, comprising:
   a computer implemented message collector for collecting messages from the plurality of electronic discussion forums;
   a computer including processing logic to process the messages based on a topic in order to track a plurality of pseudonyms, wherein the processing logic computes at least one numerical relevance score for the collected messages posted by the plurality of pseudonyms, wherein the numerical relevance score rates the relevance of the collected messages to the topic on a numerical scale, and wherein the numerical relevance score is determined based on a set of predefined rules, the set of predefined rules having a plurality of conditions defining information relevant to the topic and having an associated weighting to indicate the strength a particular condition should have in determining the relevance of the messages with respect to the topic; and
   a computer implemented report generator for generating a report on the topic using results from the processing logic, wherein the report at least indirectly reflects at least the at least one numerical relevance score for the collected messages posted by the plurality of pseudonyms;
   wherein the processing logic is further adapted to compute a buzz score based on a set of the collected messages for the topic, and wherein the buzz score is a function of the at least one numerical relevance score for messages in the set of the collected messages, and the report at least indirectly reflects the buzz score.

2. The system of claim 1, wherein the buzz score is a function of numerical influence scores of each of the posting pseudonyms that respectively posted the set of the collected messages, and wherein the influence score rates the influence of the posting pseudonym on a numerical scale.

3. The system of claim 2, wherein the buzz score is computed according to the equation:

$$B = \sum_{i=1}^{n} (Rel_i \cdot F_i),$$

where Rel is the computed numerical relevance score for a message, F is the computed numerical influence score for a poster of a message, and n is the number of messages in the set.

4. The system of claim 2, wherein the processing logic is adapted to compute a relative buzz score that measures relative changes in posting activity level, and the report at least indirectly reflects the relative buzz score.

5. The system of claim 1, wherein the processing logic further includes a textual analysis application that compares a content of the collected message with a plurality of known words and phrases indicative of expressions of sentiment to assign an opinion rating to the collected message, and the report at least indirectly reflects the opinion rating.

6. The system of claim 5, wherein the opinion rating is a numerical sentiment score on a numerical scale.

7. The system of claim 6, wherein the sentiment score is capable of being one of a positive sentiment score, a negative sentiment score and a zero sentiment score.

8. The system of claim 7, wherein the processing logic is further adapted to compute an aggregate positive sentiment score for a set of collected messages, and the report at least indirectly reflects the aggregate positive sentiment score.

9. The system of claim 8, wherein the aggregate positive sentiment score $S_p$ is computed according to the equation:

$$S_p = \sum_{i=1}^{m} s_{pm},$$

where m is the set of collected messages, and $S_{pm}$ is a positive sentiment score for a message in the set of collected messages.

10. The system of claim 8, wherein the processing logic is further adapted to compute an aggregate negative sentiment score for a set of collected messages, and the report at least indirectly reflects the aggregate negative sentiment score.

11. The system of claim 10, wherein the aggregate negative sentiment score $S_n$ is computed according to the equation:

$$S_n = \sum_{i=1}^{m} s_{nm},$$

where m is the set of collected messages, and $S_{nm}$ is a negative sentiment score for a message in the set of collected messages.

12. The system of claim 6, wherein the sentiment score is a net sentiment score.

13. The system of claim 12, wherein the processing logic is further adapted to compute an aggregate net sentiment score for a set of collected messages, and the report at least indirectly reflects the net sentiment score.

14. The system of claim 13, wherein the aggregate net sentiment score S is computed according to the equation:

$$S = \sum_{i=1}^{m} (s_{pm} - s_{nm}),$$

where m is the set of collected messages, $S_{pm}$ is a positive sentiment score for a message in the set of collected messages, and $S_{nm}$ is a negative sentiment score for the message.

15. A system as defined in claim 1, wherein the computer is a UNIX-based server.

16. A system for processing messages from a plurality of electronic discussion forums, comprising:
a computer implemented message collector for collecting messages from the plurality of electronic discussion forums;
a computer including processing logic to process the messages in order to track a plurality of pseudonyms based on a topic, wherein the processing logic computes a numerical relevance score that rates the relevance of a collected message posted by one pseudonym in the plurality of pseudonyms to the topic on a numerical scale, and wherein the processing logic computes a buzz score for a set of collected messages, wherein the buzz score is a measure of a level of activity within one or more of the electronic discussion forums and wherein the numerical relevance score is determined based on a set of rules, the rules having a plurality of conditions defining information relevant to the least one topic and having an associated weighting to indicate the strength a particular condition should have in determining the relevance of the messages with respect to the topic; and
a computer implemented report generator for generating a report on, at least in part, the topic using results from the processing logic so that the report at least indirectly reflects the buzz score.

17. The system of claim 16, wherein the processing logic is further adapted to compute a numerical migration score based on the set of messages and movement of influential posting activity within the one or more electronic discussion forums, and the report at least indirectly reflects the numerical migration score.

18. The system of claim 17, wherein the migration score provides a measurement, on a numerical scale, of the degree of movement of posting activity levels between topics or groups of topics from the topic.

19. The system of claim 17, wherein the migration score provides a measurement, on a numerical scale, of the degree of movement of posting activity levels between topics or groups of topics from the topic that is weighted by numerical influence scores of posting pseudonyms.

20. The system of claim 19, wherein the migration score includes an indication of direction of the movement.

21. The system of claim 19, wherein the migration score is computed based on a change in buzz levels.

22. The system of claim 21, wherein the migration score is computed based on the equation: $M_n = [B_n - B_{n-1}]$, wherein $B_n$ is the buzz level, on a numerical scale, for day n, and $B_{n-1}$ is the buzz level, on a numerical scale, for the previous day.

23. A system as defined in claim 16, wherein the computer is a UNIX-based server.

24. A system for tracking message activity levels in a plurality of electronic discussion forums, comprising:
a database storing a series of topics, wherein each of the electronic discussion forums is associated with a topic from the series of topics;
a computer implemented message collector for collecting messages from the plurality of electronic discussion forums; and
a computer including a message categorizer for computing numerical relevance scores of the messages, wherein at least one numerical relevance score is computed based on the associated topic for a source forum of a collected message and wherein the numerical relevance scores are determined based on a set of rules, the rules having a plurality of conditions defining information relevant to the series of topics and having an associated weighting to indicate the strength a particular condition should have in determining the relevance of the messages with respect to the series of topics; and a computer implemented report generator for generating a report on the associated topic reflecting, at least indirectly, the numerical relevance scores;

wherein the at least one numerical relevance score rates the relevance of the collected message to the topic on a numerical scale;

wherein at least one of the message collector or the message categorizer is adapted to extract a pseudonym author of the collected message to track a plurality of pseudonyms;

wherein at least one of the message collector or the message categorizer is adapted to compute a numerical influence score for the extracted pseudonym author, and wherein the influence score rates the influence of the extracted pseudonym author on a numerical scale, and the report at least indirectly reflects the numerical influence score; and wherein at least one of the message collector and the message categorizer is adapted to compute a numerical buzz score for a topic or group of topics from the series of topics, and the report at least indirectly reflects the numerical buzz score.

25. The system of claim 24, wherein the database comprises a table that links forums to associated topics.

26. The system of claim 24, wherein the at least one numerical relevance score comprises multiple relevance scores corresponding to multiple associated topics, and wherein the highest one of the multiple relevance scores is maintained and the other of the multiple relevance scores are discarded or ignored.

27. The system of claim 24, wherein the extracted pseudonym author is analyzed to determine if the extracted pseudonym author is a new author or a previously-tracked author.

28. The system of claim 27, wherein the determination is made by comparing the extracted pseudonym author to an author's table that stores a plurality of previously-tracked authors.

29. The system of claim 24, wherein the influence score is based at least in part on the impact of prior postings by the extracted pseudonym author on other pseudonym authors.

30. The system of claim 24, wherein at least one of the message collector or the message categorizer is adapted to compute a numerical reputation score for the extracted pseudonym author, and wherein the reputation score rates the extracted pseudonym author's reputation on a numerical scale, and the report at least indirectly reflects the numerical reputation score.

31. The system of claim 30, wherein the reputation score is based on a plurality of influence scores for the extracted pseudonym author under multiple local pseudonyms that have been associated into a universal pseudonym.

32. The system of claim 24, wherein at least one of the message collector or the message categorizer is adapted to compute a relative numerical buzz score for the topic or the group of topics, and the report at least indirectly reflects the relative numerical buzz score.

33. The system of claim 32, wherein the relative buzz score is compared to an anomaly threshold in order to identify unusual discussion patterns.

34. The system of claim 24 or claim 32, wherein the electronic discussion forums include forums related to one or more of financial markets, stock exchanges, financial instruments and financial information.

35. The system of claim 24 or claim 32, wherein the series of topics includes one or more of financial markets and financial instruments.

36. The system of claim 24 or claim 32, wherein the group of topics corresponds to a stock index, and wherein the buzz score or the relative buzz score is computed by aggregating the buzz scores for the stocks making up the stock index.

37. The system of claim 24 or claim 32, wherein the group of topics corresponds to a market sector, and wherein the buzz score or the relative buzz score is computed by aggregating the buzz scores for stocks making up the sector.

38. The system of claim 24 or claim 32, wherein the series of topics includes a plurality of movies or a plurality of television shows.

39. The system of claim 24, wherein at least one of the message collector or the message categorizer is adapted to compute a numerical migration score for the topic or the group of topics, and wherein the migration score is computed on a numerical scale based on a change in buzz scores for the topic or group of topics, and the report at least indirectly reflects the numerical migration score.

40. A system as defined in claim 24, wherein the computer is a UNIX-based server.

41. A method for processing message traffic from a plurality of electronic discussion forums, comprising:

collecting messages from the plurality of electronic discussion forums;

processing with a processor the messages based on a topic in order to track a plurality of pseudonyms, wherein processing the messages comprises computing a numerical relevance score that rates the relevance of a collected message to the topic on a numerical scale, and wherein the numerical relevance score is determined based on a set of predefined rules, the predefined rules having a plurality of conditions defining information relevant to the topic and having an associated weighting to indicate the strength a particular condition should have in determining the relevance of the messages with respect to the topic; and storing a report in a tangible memory regarding, at least in part, the topic, wherein a report output is based upon, at least in part, the numerical relevance score of a collected message and characteristics of the plurality of pseudonyms;

wherein processing the messages further comprises computing a numerical buzz score based on a set of messages for the topic, wherein the report output is also based upon, at least in part, the numerical buzz score.

42. The method of claim 41, wherein the buzz score measures posting activity level, on a numerical scale, weighted by the degree of relevance of the set of messages and the degree of influence of posting pseudonyms that posted the set of messages.

43. The method of claim 42, wherein processing the messages comprises computing a relative buzz score that measures relative changes in the posting activity level, wherein the report output is also based upon, at least in part, the relative buzz score.

44. The method of claim 41, wherein the buzz score is computed according to the equation:

$$B = \sum_{i=1}^{n} (Rel_i \cdot F_i),$$

where Rel is a computed numerical relevance score for a message, F is a computed numerical influence score for a poster of a message, and n is the number of messages in the set.

45. A method for processing messages from a plurality of electronic discussion forums, comprising:
- collecting messages from the plurality of electronic discussion forums;
- processing with a processor the messages based on a topic, wherein processing the messages comprises computing a numerical relevance score that rates the relevance of a collected message to the topic on a numerical scale, the numerical relevance score being determined based on a set of predefined rules, the predefined rules having a plurality of conditions defining information relevant to the topic and having an associated weighting to indicate the strength a particular condition should have in determining the relevance of the messages with respect to the topic, and wherein processing the messages comprises computing a buzz score for a set of collected messages, the buzz score being a measure of a level of activity within one or more of the electronic discussion forums; and
- storing a report in a tangible memory on, at least in part, the topic, wherein a report output is based upon, at least in part, the numerical relevance score and the buzz score.

46. The method of claim 45, wherein processing the messages further comprises computing a numerical migration score based on the set of messages and movement of influential posting activity within the one or more electronic discussion forums, and the report output is further based upon, at least in part, the numerical migration score.

47. The method of claim 46, wherein the migration score provides a measurement, on a numerical scale, of the degree of movement of posting activity levels between topics or groups of topics from the topic.

48. The method of claim 47, wherein the migration score includes an indication of direction of the movement.

49. The method of claim 46, wherein the migration score provides a measurement, on a numerical scale, of the degree of movement of posting activity levels between topics or groups of topics from the topic that is weighted by influence scores of posting pseudonyms.

50. The method of claim 47, wherein the migration score is computed based on a change in the buzz score.

51. A method for processing messages from a plurality of electronic discussion forums, comprising:
- collecting messages from the plurality of electronic discussion forums; and
- processing with a processor the messages based on a series of topics in order to track a plurality of pseudonyms, wherein processing the messages comprises computing a relevance score for a collected message based on a topic and wherein the relevance score is determined based on a set of rules, the rules having a plurality of conditions defining information relevant to the topic and having an associated weighting to indicate the strength a particular condition should have in determining the relevance of the messages with respect to the topic, and wherein processing the messages comprises computing a buzz score for a set of collected messages;
- wherein processing the messages further comprises computing a migration score based on the set of messages;
- wherein the migration score provides a measurement of the movement of posting activity levels between topics or groups of topics from the series of topics;
- wherein the migration score is computed based on a change in buzz levels; wherein the migration score is computed based on the equation: $M_n = [B_n - B_{n-1}]$, wherein $B_n$ is the buzz level for day n and $B_{n-1}$ is the buzz level for the previous day;
- the method further comprising storing a report in a tangible memory on, at least in part, the topic, wherein a report output is based upon, at least in part, the migration score.

52. The method of claim 51, wherein processing the messages further comprises computing a sentiment score measuring a degree in which the collected message exhibits one or more of (a) positive sentiment, (b) negative sentiment and (c) no sentiment associated with the topic wherein the report output is further based upon, at least in part, the sentiment score.

53. A method for tracking message activity levels in a plurality of electronic discussion forums, comprising:
- storing a series of topics in a database, wherein each of the electronic discussion forums is associated with a topic from the series of topics;
- collecting messages from the plurality of electronic discussion forums;
- computing with a processor numerical relevance scores of the messages, wherein at least one of the numerical relevance scores is computed based on the associated topic for a source forum of a collected message, and wherein each of the numerical relevance scores rates the relevance of the corresponding collected message to the topic on a numerical scale and wherein each of the numerical relevance scores is determined based on a set of rules, the rules having a plurality of conditions defining information relevant to the associated topic and having an associated weighting to indicate the strength a particular condition should have in determining the relevance of the messages with respect to the associated topic;
- extracting a pseudonym author of at least one collected message to track a plurality of pseudonyms;
- computing a numerical influence score for the extracted pseudonym author;
- storing a report in a tangible memory regarding, at least in part, the topic, wherein a report output is based upon, at least in part, at least one of the numerical relevance scores and at least one of the numerical influence scores; and
- computing a numerical buzz score for a topic or group of topics from the series of topics, wherein the numerical buzz score is a measure of a level of activity within one or more of the electronic discussion forums and the report output is further based upon, at least in part, the numerical buzz score.

54. The method of claim 53, further comprising linking forums to associated topics in a table in the database.

55. The method of claim 53, wherein the at least one relevance score comprises multiple relevance scores corresponding to multiple associated topics, and wherein the highest one of the multiple relevance scores is maintained and the other of the multiple relevance scores are discarded or ignored.

56. The method of claim 53, further comprising analyzing the extracted pseudonym author to determine if the extracted pseudonym author is a new author or a previously-tracked author.

57. The method of claim 56, wherein the determination is made by comparing the extracted pseudonym author to an author's table that stores a plurality of previously-tracked authors.

58. The method of claim 53, wherein the influence score is based at least in part on an impact of prior postings by the extracted pseudonym author on other pseudonym authors.

59. The method of claim 53, further comprising computing a numerical reputation score for the extracted pseudonym author, wherein the report output is further based upon, at least in part, the numerical reputation score.

60. The method of claim 59, wherein the reputation score is based on a plurality of influence scores for the extracted pseudonym author under multiple local pseudonyms that have been associated into a universal pseudonym.

61. The method of claim 53, further comprising computing a relative buzz score for the topic or the group of topics, wherein the report output is further based upon, at least in part, the relative buzz score.

62. The method of claim 61, wherein the relative buzz score is compared to an anomaly threshold in order to identify unusual discussion patterns.

63. The method of claim 53 or claim 61, wherein the electronic discussion forums include forums related to one or more of financial markets, stock exchanges, financial instruments and financial information.

64. The method of claim 53 or claim 61, wherein the series of topics includes one or more of financial markets and financial instruments.

65. The method of claim 53 or claim 61, wherein the group of topics corresponds to a stock index, and wherein the buzz score or the relative buzz score is computed by aggregating the buzz scores for the stocks making up the stock index.

66. The method of claim 53 or claim 61, wherein the group of topics corresponds to a market sector, and wherein the buzz score or the relative buzz score is computed by aggregating the buzz scores for stocks making up the sector.

67. The method of claim 53 or claim 61, wherein the series of topics includes a plurality of movies or a plurality of television shows.

68. The method of claim 53 further comprising computing a numerical migration score for the topic or the group of topics, wherein the migration score is computed based on a change in buzz scores for the topic or group of topics, and wherein the report output is further based upon, at least in part, the migration score.

69. A computer implemented method for tracking and reporting electronic message activity in one or more electronic discussions, comprising:

collecting by a computer system a plurality of messages from one or more electronic discussions;

for each message, processing the message to track a plurality of pseudonyms by computing by the computer system a numerical relevance score for the message posted by one of the plurality of pseudonyms based upon, at least in part, the relevance of the message to a topic, wherein the numerical relevance score of each message is computed on a numerical scale, and wherein the numerical relevance score of each message is determined based on a set of predefined rules, the predefined rules having a plurality of conditions defining information relevant to the topic and having an associated weighting to indicate the strength a particular condition should have in determining the relevance of the messages with respect to the topic;

for each message, determining by the computer system the presence of at least one of a positive sentiment, a negative sentiment and an absence of sentiment;

compiling by the computer system analysis results based upon, at least in part, the topic, the relevance scores for the plurality of messages and the determination of the presence of at least one of the positive sentiment, negative sentiment and absence of sentiment in each message;

generating by the computer system an electronic message activity report using the analysis results;

computing a numerical buzz score for the topic, wherein the report at least indirectly reflects the numerical buzz score.

70. The computer implemented method of claim 69, wherein determining the presence of at least one of the positive sentiment, negative sentiment and absence of sentiment in each message includes analyzing by the computer system textual patterns in the message for the expression of sentiment.

71. The computer implemented method of claim 70, wherein analyzing textual patterns in the message for the expression of sentiment includes consulting a sentiment model that includes words used for expressing positive and negative sentiment for the topic.

72. The computer implemented method of claim 71, wherein the sentiment model is a financial sentiment model.

73. The computer implemented method of claim 71, wherein the sentiment model is an entertainment sentiment model.

74. The computer implemented method of claim 69, wherein determining the presence of at least one of the positive sentiment, negative sentiment and absence of sentiment in each message includes computing a numerical sentiment rating on a numerical scale and compiling the analysis results based further upon the numerical sentiment ratings for the plurality of messages.

75. The computer implemented method of claim 74, wherein computing a numerical sentiment rating on a numerical scale computes both a positive sentiment rating and a negative sentiment rating, and compiling the analysis results is based farther upon the positive and negative sentiment ratings for the plurality of messages.

76. The computer implemented method of claim 74, further comprising aggregating by the computer system the sentiment ratings for the plurality of messages, and compiling the analysis results is based further upon the aggregated sentiment ratings.

* * * * *

UNITED STATES PATENT AND TRADEMARK OFFICE
CERTIFICATE OF CORRECTION

PATENT NO. : 7,600,017 B2
APPLICATION NO. : 11/651661
DATED : October 6, 2009
INVENTOR(S) : Holtzman et al.

It is certified that error appears in the above-identified patent and that said Letters Patent is hereby corrected as shown below:

Col. 38, line 48: "farther" should be changed to --further--

Signed and Sealed this

Eighth Day of December, 2009

David J. Kappos
*Director of the United States Patent and Trademark Office*